(12) United States Patent
Saito et al.

(10) Patent No.: US 8,333,098 B2
(45) Date of Patent: Dec. 18, 2012

(54) BENDING METHOD

(75) Inventors: Masaki Saito, Okazaki (JP); Shingo Hashimoto, Okazaki (JP)

(73) Assignee: Aisin Aw Co., Ltd., Aichi-Ken (JP)

( * ) Notice: Subject to any disclaimer, the term of this patent is extended or adjusted under 35 U.S.C. 154(b) by 387 days.

(21) Appl. No.: 12/825,451

(22) Filed: Jun. 29, 2010

(65) Prior Publication Data

US 2011/0030445 A1 Feb. 10, 2011

(30) Foreign Application Priority Data

Aug. 7, 2009 (JP) ................................. 2009-185248

(51) Int. Cl.
*B21D 31/00* (2006.01)
*B21D 13/02* (2006.01)
(52) U.S. Cl. ........... 72/362; 72/385; 72/379.6; 140/92.1
(58) Field of Classification Search .................... 72/176, 72/178–182, 306, 307, 380, 384, 385, 362, 72/379.6, 381; 140/6, 7, 9, 3 A, 3 CA, 72, 140/92.1, 105
See application file for complete search history.

(56) References Cited

U.S. PATENT DOCUMENTS

| | | | | |
|---|---|---|---|---|
| 2,996,590 A * | 8/1961 | Shockroo et al. | ........... | 337/86 |
| 4,351,178 A * | 9/1982 | Uehara et al. | ........... | 72/383 |
| 4,456,036 A | 6/1984 | Rossi | | |
| 5,266,858 A * | 11/1993 | Ohmi et al. | ........... | 310/208 |
| 6,865,796 B1 * | 3/2005 | Oohashi et al. | ........... | 29/596 |
| 6,885,123 B2 * | 4/2005 | Gorohata et al. | ........... | 310/201 |
| 7,155,805 B2 * | 1/2007 | Nakamura | ........... | 29/596 |
| 7,181,929 B2 * | 2/2007 | Watanabe | ........... | 62/515 |
| 2003/0034703 A1 * | 2/2003 | Oohashi et al. | ........... | 310/68 B |
| 2005/0046299 A1 * | 3/2005 | Brown et al. | ........... | 310/207 |
| 2008/0072990 A1 * | 3/2008 | Knappenberger | ........... | 140/92.1 |
| 2008/0149315 A1 * | 6/2008 | Hata et al. | ........... | 165/162 |

FOREIGN PATENT DOCUMENTS

| | | |
|---|---|---|
| JP | 52-16274 Y2 | 4/1977 |
| JP | 58-176037 U | 11/1983 |
| JP | 19770412 * | 8/2001 |

OTHER PUBLICATIONS

International Search Report for corresponding International Patent Application No. PCT/JP2010/004314 mailed Aug. 24, 2010.

* cited by examiner

*Primary Examiner* — Dana Ross
*Assistant Examiner* — Onekki Jolly
(74) *Attorney, Agent, or Firm* — Sughrue Mion, PLLC

(57) ABSTRACT

A bending method for forming, in a material in which several straight portions extending in parallel with each other and a first-end side coupling portion and a second-end side coupling portion provided alternately to couple first-end portions and second-end portions, respectively, of adjacent ones of the straight portions with each other are successively formed, folded portions respectively in a pair of the straight portions provided on both sides of the first-end side coupling portion. A length from one of the folded portions to the first-end side coupling portion is different from a length from the other of the folded portions. The bending method includes shaping the material such that the first-end side coupling portion is inclined with respect to a direction orthogonal to the pair of the straight portions in accordance with a difference between the lengths of the folded portions to be respectively formed in both the straight portions; and thereafter forming the folded portions in both the straight portions at the same time. The folded portions being bent in the same direction as each other.

3 Claims, 40 Drawing Sheets

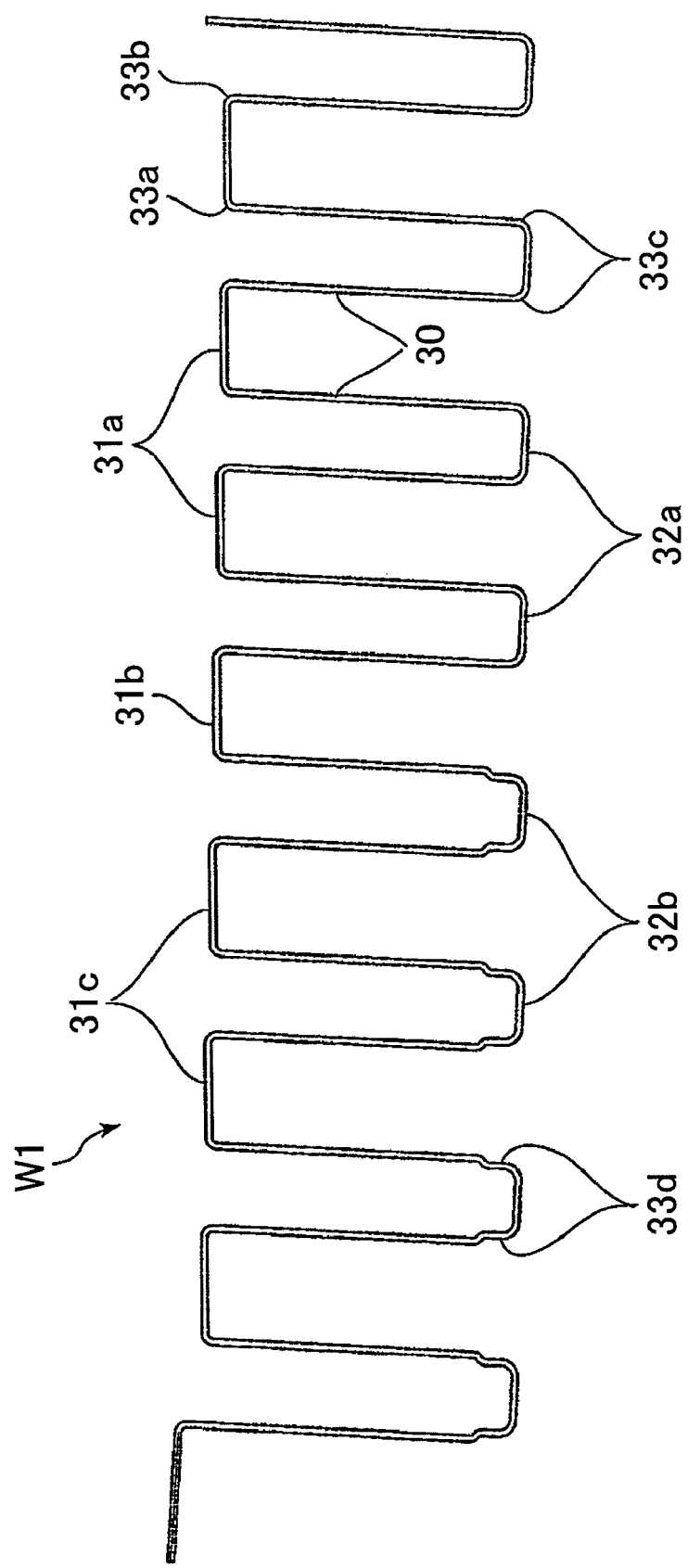

F I G . 10
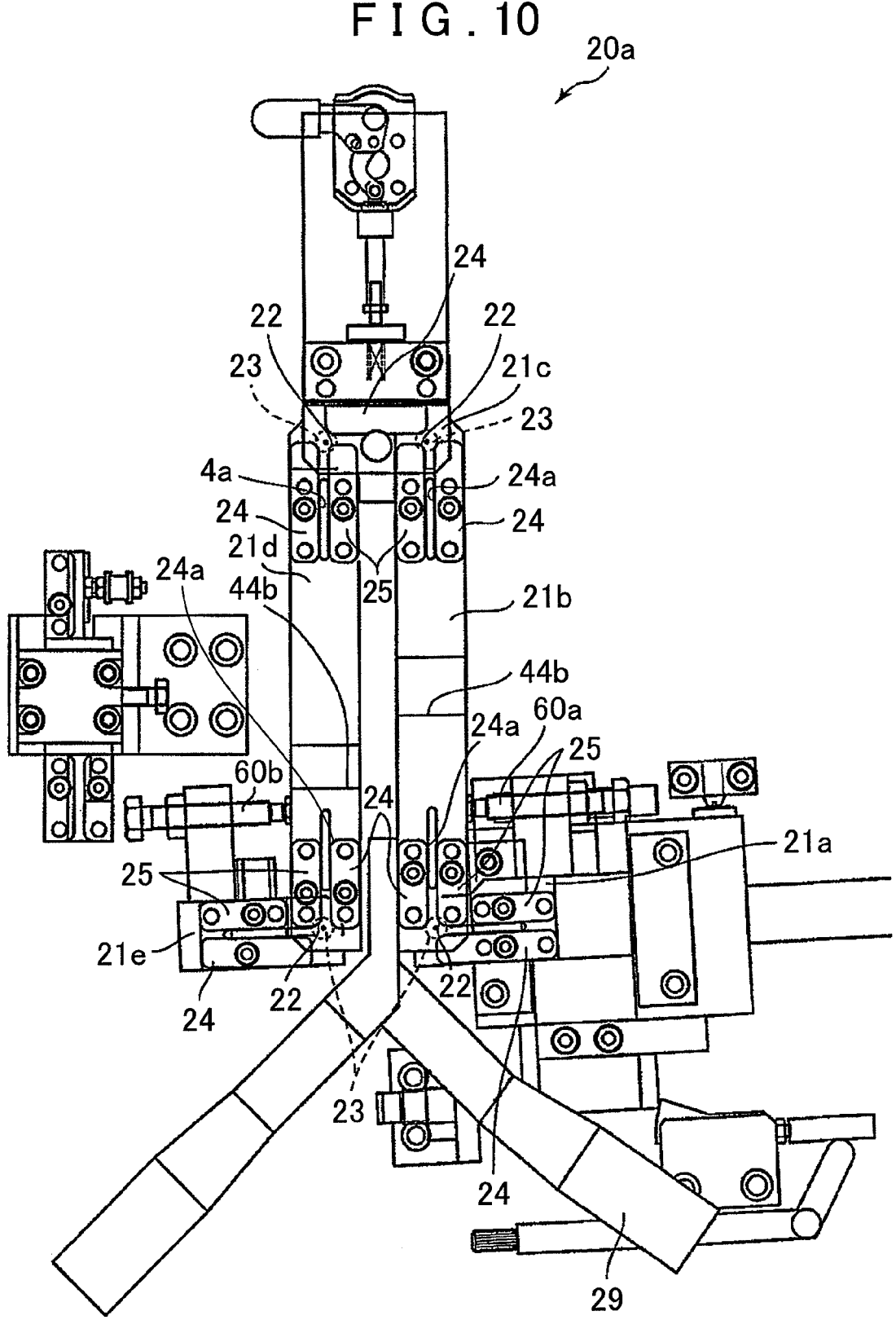

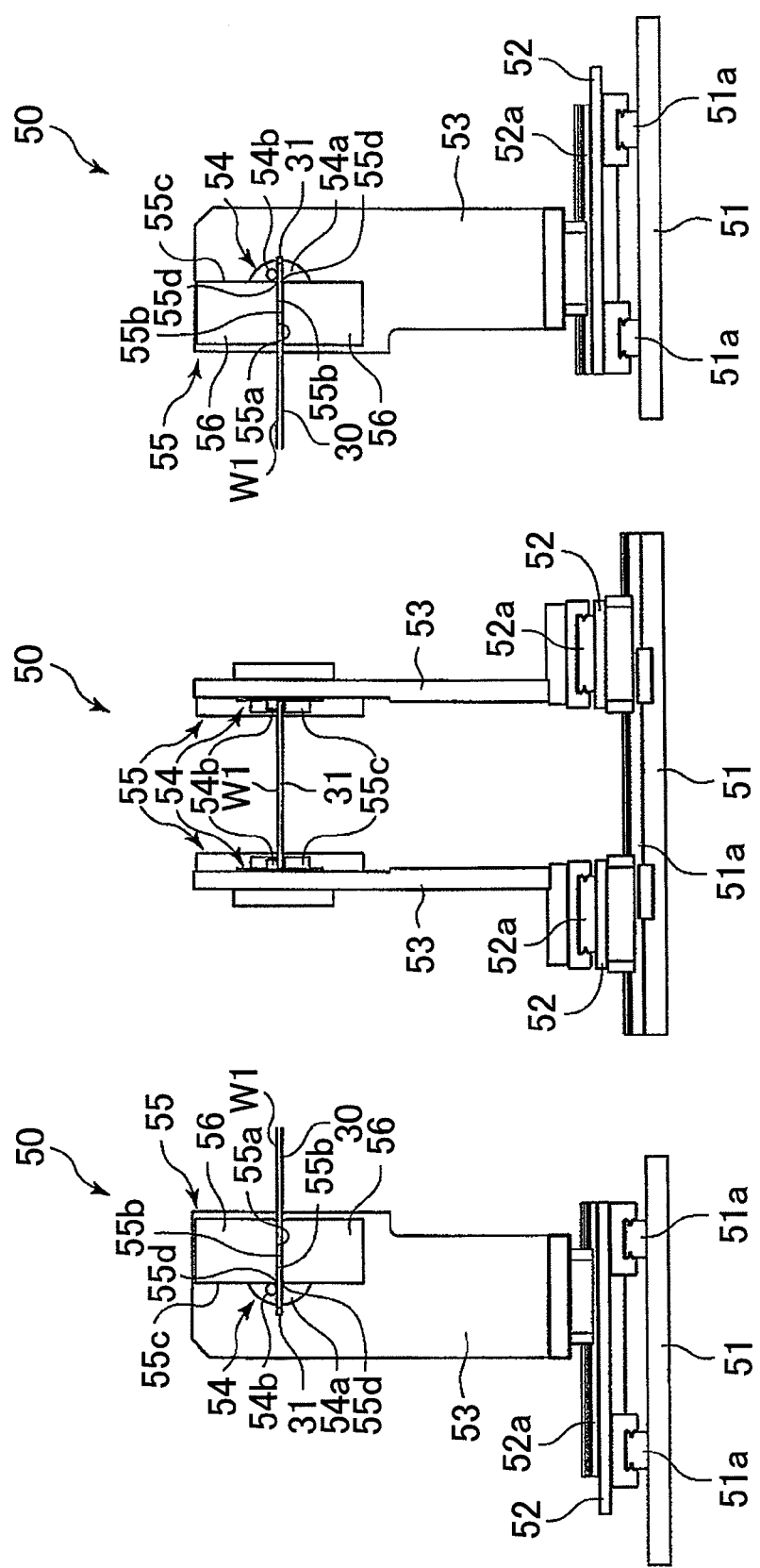

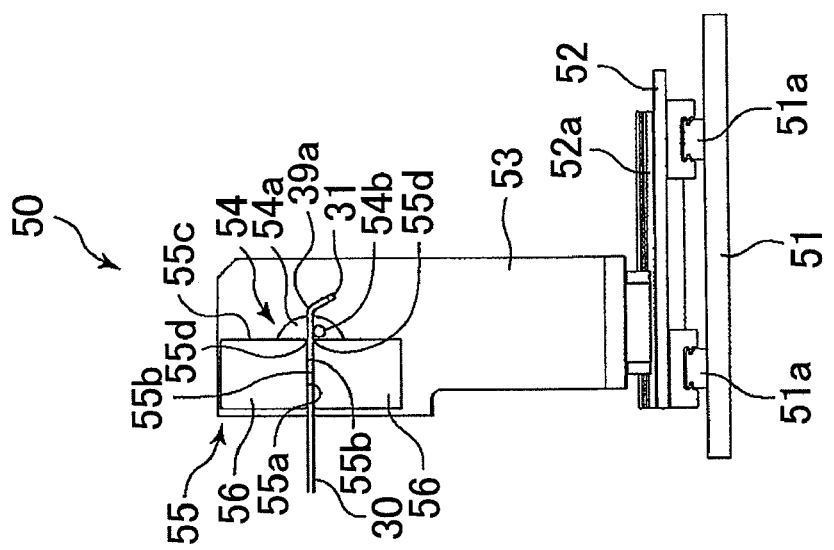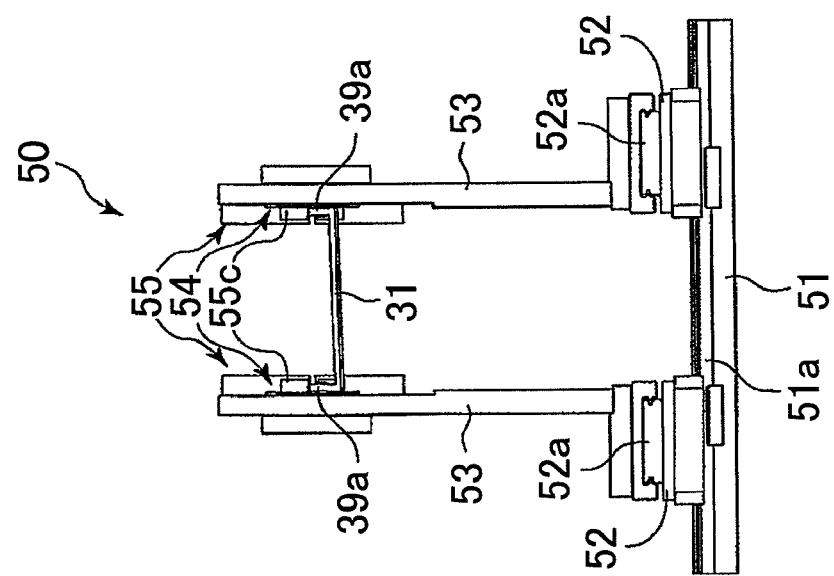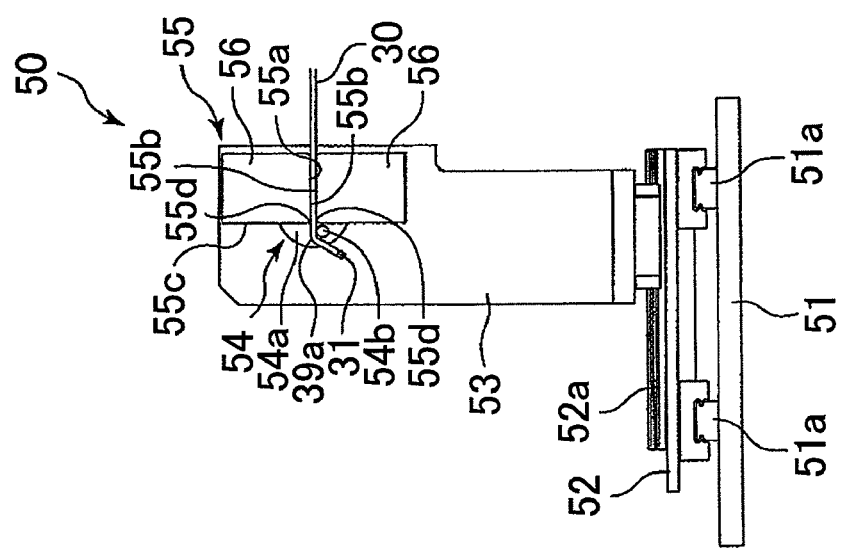

BENDING METHOD

INCORPORATION BY REFERENCE

The disclosure of Japanese Patent Application No. 2009-185248 filed on Aug. 7, 2009 including the specification, drawings and abstract is incorporated herein by reference in its entirety.

BACKGROUND OF THE INVENTION

The present invention relates to a bending method for performing a bending process on a predetermined material such as a metal wire with a circular or rectangular cross section (for example, a rectangular wire) forming a winding (a magnet wire) for a rotary electric machine, a bar material, a pipe material, and a plate material.

DESCRIPTION OF THE RELATED ART

In general, rotary electric machines such as induction motors and direct-current motors (including generators) are widely used as power sources for industries or vehicles. Stator coils of the rotary electric machines are often formed by distributed winding which produces high specific power. It has recently been proposed to use a rectangular wire, which yields a high space factor, as a magnet wire in motors for use in hybrid vehicles and electric vehicles in view of output/dimensional requirements.

The magnet wire used in the rotary electric machines discussed above is folded at a plurality of locations to form a coil. A technique in which a material is successively fed to a bending apparatus to perform a bending process on a material at one location at a time is known (see Japanese Patent Application Publication No. JP-U-Sho 58-176037).

SUMMARY OF THE INVENTION

A technique for forming a coil with distributed winding discussed above has been developed, although not disclosed yet. As discussed later in FIGS. 23A to 23C, the technique includes forming, in a material in which a plurality of straight portions 30, 30 extending in parallel with each other and a first-end side coupling portion 31 and second-end side coupling portions 32a, 32b (see FIG. 3) coupling first-end portions and second-end portions, respectively, of adjacent ones of the straight portions 30, 30 with each other are formed, crank portions 12a, 12b respectively in part of a pair of the straight portions 30, 30 on both sides of the first-end side coupling portion 31. Each of the crank portions 12a, 12b includes a pair of folded portions 39a, 39b bent in directions opposite to each other. The length between the first-end side coupling portion 31 and one of the pair of folded crank portions 12a, 12b on the second-end side formed in one of the pair of the straight portions 30, 30 is different from the length between the first-end side coupling portion 31 and one of the pair of folded crank portions 12a, 12b on the second-end side formed in the other of the pair of the straight portions 30, 30. The crank portions 12a, 12b with different lengths are formed to appropriately combine coils for three phases and incorporate the combined coils in a stator core 2 into a space-saving manner as shown in FIGS. 1A and 1B to be discussed later.

In order to form a coil having the crank portions 12a, 12b discussed above, it is considered, for example, to individually form the crank portions 12a, 12b in the straight portions 30 as shown in FIGS. 33 to 37. To this end, first, as shown in FIGS. 33A and 33B, a material W2 (see FIG. 4, for example) such as a straight magnet wire is folded to obtain a material W1 in which a plurality of straight portions 30, 30 and a first-end side coupling portion 31 and second-end side coupling portions 32a, 32b (see FIG. 3) coupling first ends and second ends, respectively, of adjacent ones of the straight portions 30, 30 are formed. In this state, the first-end side coupling portion 31 has been folded substantially orthogonally to a pair of straight portions 30, 30 on both sides of the first-end side coupling portion 31. Next, as shown in FIGS. 34A and 34B, with a part of one of the straight portions 30 clamped (a clamp portion C indicated by the shaded area), a portion of the one of the straight portions 30 on the coupling portion 31 side is folded to one side to form the folded portion 39a (a shaped portion F indicated by the black area). Then, as shown in FIGS. 35A and 35B, with a part of the one of the straight portions 30 clamped (a clamp portion C indicated by the shaded area), a portion of the one of the straight portions 30 on the coupling portion 31 side is folded to the other side than the case of FIGS. 34A and 34B to form the folded portion 39b (a shaped portion F indicated by the black area). In this way, the crank portion 12a is formed in the one of the straight portions 30.

Next, as shown in FIGS. 36A and 36B, with the other of the straight portions 30 clamped at a position at a different distance from the coupling portion 31 than the case of the one of the straight portions 30 (a clamp portion C indicated by the shaded area), a portion of the other of the straight portions 30 on the coupling portion 31 side is folded to one side to form the folded portion 39a (a shaped portion F indicated by the black area). Then, as shown in FIGS. 37A and 37B, with a part of the other of the straight portions 30 clamped (a clamp portion C indicated by the shaded area), a portion of the other of the straight portions 30 on the coupling portion 31 side is folded to the other side than the case of FIGS. 36A and 36B to form the folded portion 39b (a shaped portion F indicated by the black area). In this way, the crank portion 12b is formed in the other of the straight portions 30. From the state of FIGS. 37A and 37B, further, the coupling portion 31 is inclined in a twisted manner such that both the straight portions 30, 30 overlap each other in FIG. 37B.

In the case where the crank portions 12a, 12b are individually formed in the straight portions 30 as discussed above, the number of processing steps is large, and therefore the processing time is inevitably long. Moreover, as shown in FIGS. 34B and 36B, one of the straight portions 30 is tilted significantly along the bending direction while the other of the straight portions 30 is processed. Such bending processes are performed while successively feeding the material W2 such as a magnet wire wound around a bobbin, for example. Therefore, it is necessary to secure a space that allows the tilting of the straight portions 30 or to move a feeding mechanism along with the tilting, which inevitably increases the size of the bending apparatus. In any case, it is difficult to smoothly tilt the straight portions 30 and to secure the processing accuracy.

In contrast, it is considered to form the crank portions 12a, 12b in the pair of straight portions 30, 30 on both sides of the first-end side coupling portion 31 at the same time as shown in FIGS. 38 to 40. First, a material W1 in the shape shown in FIGS. 38A to 38C is obtained as in the case discussed above. Next, as shown in FIGS. 39A to 39C, with the pair of the straight portions 30, 30 clamped at portions at different distances from the first-end side coupling portion 31 (clamp portions C indicated by the shaded areas), portions of both the straight portions 30, 30 on the first-end side coupling portion 31 side are folded to one side at the same time to respectively form the folded portions 39a, 39a in the straight portions 30, 30 (shaped portions F indicated by the black areas). Then, as shown in FIGS. 40A to 40C, with part of both the straight portions 30, 30 clamped (clamp portions C indicated by the shaded areas), portions of both the straight portions 30, 30 on the first-end side coupling portion 31 side are folded to the other side than the case of FIGS. 39A to 39C to respectively form the folded portions 39b, 39b in the straight portions 30, 30 (shaped portions F indicated by the black areas). In this way, the crank portions 12a, 12b are formed in both the straight portions 30, 30 at the same time.

In the case where the crank portions 12a, 12b are formed in both the straight portions 30, 30 at the same time in the method discussed above, the first-end side coupling portion 31 is inclined with respect to the direction orthogonal to both the straight portions 30, 30 as shown in FIG. 40A. In a coil with distributed winding, it is necessary that the first-end side coupling portion 31 should be substantially orthogonal to both the straight portions 30, 30. Therefore, the formation method discussed above further requires a step of making the first-end side coupling portion 31 orthogonal to both the straight portions 30, 30 from the state of FIGS. 40A to 40C, which also increases the number of processing steps and hence the processing time.

It is therefore an object of the present invention to provide a bending method in which a pair of folded portions with different lengths can be formed in a pair of straight portions on both sides of a one-end side coupling portion at the same time in a short processing time and with improved processing accuracy.

The present invention provides a bending method for forming, in a material (W1) in which a plurality of straight portions (30, 30) extending in parallel with each other and a first-end side coupling portion (31, 31a, 31b, 31c) and a second-end side coupling portion (32a, 32b) provided alternately to couple first-end portions and second-end portions, respectively, of adjacent ones of the straight portions (30, 30) with each other are successively formed, folded portions (39a, 39b) respectively in a pair of the straight portions (30, 30) provided on both sides of the first-end side coupling portion (31, 31a, 31b, 31c), a length from one of the folded portions (39a, 39b) to the first-end side coupling portion (31, 31a, 31b, 31c) being different from a length from the other of the folded portions (39a, 39b) to the first-end side coupling portion (31, 31a, 31b, 31c). The bending method includes the steps of: shaping the material (W1) such that the first-end side coupling portion (31) is inclined with respect to a direction orthogonal to the pair of the straight portions (30, 30) in accordance with a difference between the lengths of the folded portions (39a, 39b) to be respectively formed in both the straight portions (30, 30); and thereafter forming the folded portions (39a or 39b) in both the straight portions (30, 30) at the same time, the folded portions (39a or 39b) being bent in the same direction as each other.

A pair of folded portions (39a, 39b) bent in directions opposite to each other may be formed in each of the pair of the straight portions (30, 30), a length between the first-end side coupling portion (31, 31a, 31b, 31c) and one (39b) of the pair of folded portions on the second-end side in one of the straight portions (30, 30) being different from a length between the first-end side coupling portion (31, 31a, 31b, 31c) and one (39b) of the pair of folded portions on the second-end side in the other of the straight portions (30, 30).

The folded portions (39a or 39b) may be formed in the state where portions of both the straight portions (30, 30) on a side opposite to the first-end side coupling portion (31) with respect to the folded portions (39a or 39b) are fixed.

The reference numerals in the above parentheses are provided for reference to the drawings, and should not be construed as affecting the scope of the claims in any way.

According to a first aspect of the present invention, the first-end side coupling portion is inclined with respect to the direction orthogonal to the pair of straight portions in accordance with the difference between the lengths of the folded portions to be respectively formed in both the straight portions before the folded portions are formed in both the straight portions at the same time. Therefore, the first-end side coupling portion is prevented from being inclined from a desired state with respect to both the straight portions after the folded portions are formed. As a result, the processing time can be reduced.

According to a second aspect of the present invention, the first-end side coupling portion is prevented from being inclined from a desired state with respect to both the straight portions after the pair of folded portions are formed. Therefore, the processing time can be reduced.

According to a third aspect of the present invention, the straight portions are not tilted during processing, which improves the processing accuracy.

BRIEF DESCRIPTION OF THE DRAWINGS

FIGS. 1A and 1B show a stator incorporating coils manufactured in accordance with the present invention, in which FIG. 1A is a perspective view and FIG. 1B is a plan view;

FIGS. 2A and 2B show a coil (V-phase), in which FIG. 2A is a perspective view and FIG. 2B is a plan view;

FIG. 3 shows an intermediate material of a coil manufactured in accordance with the present invention;

FIG. 10 is a plan view of the bending apparatus showing a state after a bending process;

FIGS. 21A to 21C show a part of the material obtained in FIGS. 4 to 20, in which FIG. 21A is a front view, FIG. 21B is a side view, and FIG. 21C is a view seen from the top of FIG. 21A;

FIGS. 22A to 22C show a first step of a method for performing a further bending process on the material, in which FIG. 22A is a front view, FIG. 22B is a side view, and FIG. 22C is a view seen from the top of FIG. 22A;

FIGS. 23A to 23C show a second step of the same method, in which FIG. 23A is a front view, FIG. 23B is a side view, and FIG. 23C is a view seen from the top of FIG. 23A;

FIGS. 24A to 24C show a state in which the material is placed on a bending apparatus used in the bending method performed in FIGS. 21 to 23, in which FIG. 24A is a left side view of FIG. 24B, FIG. 24B is a front view, and FIG. 24C is a right side view of FIG. 24B;

FIGS. 25A to 25C show a first step of the same bending process, in which FIG. 25A is a left side view of FIG. 25B, FIG. 25B is a front view, and FIG. 25C is a right side view of FIG. 25B;

FIGS. 26A to 26C show a second step of the same bending process, in which FIG. 26A is a left side view of FIG. 26B, FIG. 26B is a front view, and FIG. 26C is a right side view of FIG. 26B;

FIGS. 27A to 27C show a third step of the same bending process, in which FIG. 27A is a left side view of FIG. 27B, FIG. 27B is a front view, and FIG. 27C is a right side view of FIG. 27B;

FIGS. 33A and 33B show a part of a material used in a first method for forming crank portions with different lengths in both straight portions, which is considered in the course of achieving the present invention, in which FIG. 33A is a front view and FIG. 33B is a side view;

FIGS. 34A and 34B show a first step of a method for performing a further bending process on the material, in which FIG. 34A is a front view and FIG. 34B is a side view;

FIGS. 35A and 35B show a second step of the same method, in which FIG. 35A is a front view and FIG. 35B is a side view;

FIGS. 36A and 36B show a third step of the same method, in which FIG. 36A is a front view and FIG. 36B is a side view;

FIGS. 37A and 37B show a fourth step of the same method, in which FIG. 37A is a front view and FIG. 37B is a side view;

FIGS. 38A to 38C show a part of a material used in a second method for forming crank portions with different lengths in both straight portions, which is considered in the course of achieving the present invention, in which FIG. 38A is a front view, FIG. 38B is a side view, and FIG. 38C is a view seen from the top of FIG. 38A;

FIGS. 39A to 39C show a first step of a method for performing a further bending process on the material, in which FIG. 39A is a front view, FIG. 39B is a side view, and FIG. 39C is a view seen from the top of FIG. 39A; and FIGS. 40A to 40C show a second step of the same method, in which FIG. 40A is a front view, FIG. 40B is a side view, and FIG. 40C is a view seen from the top of FIG. 40A.

DETAILED DESCRIPTION OF THE EMBODIMENTS

First Embodiment

Figure 1A:
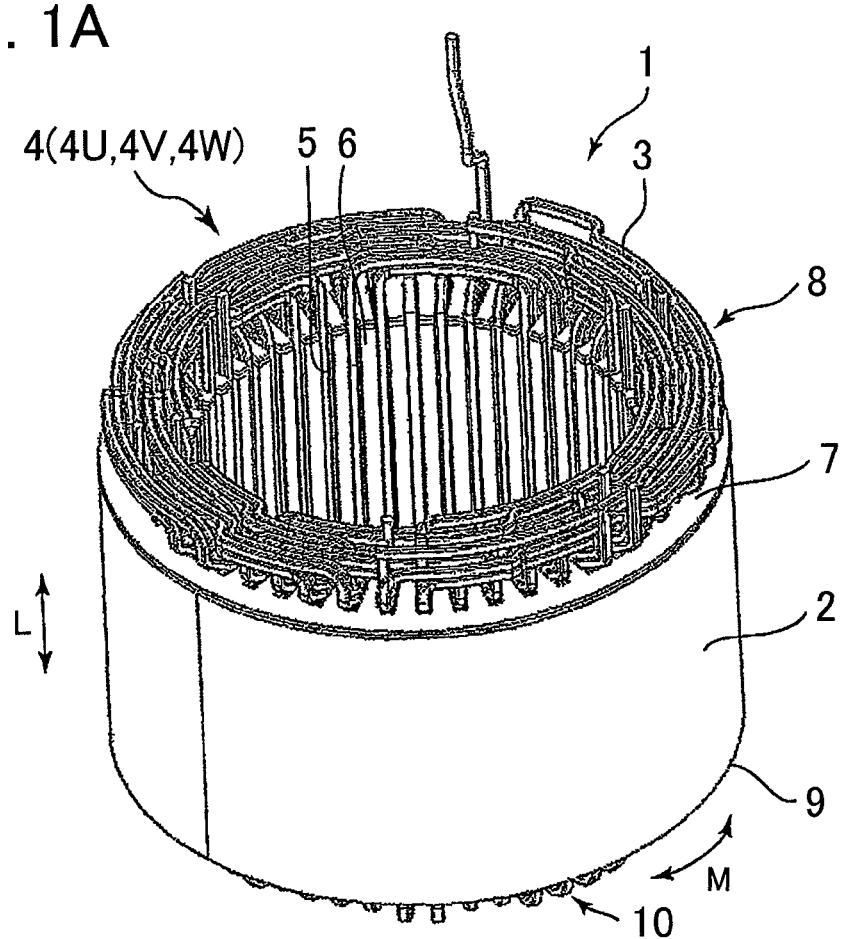
Figure 1B:
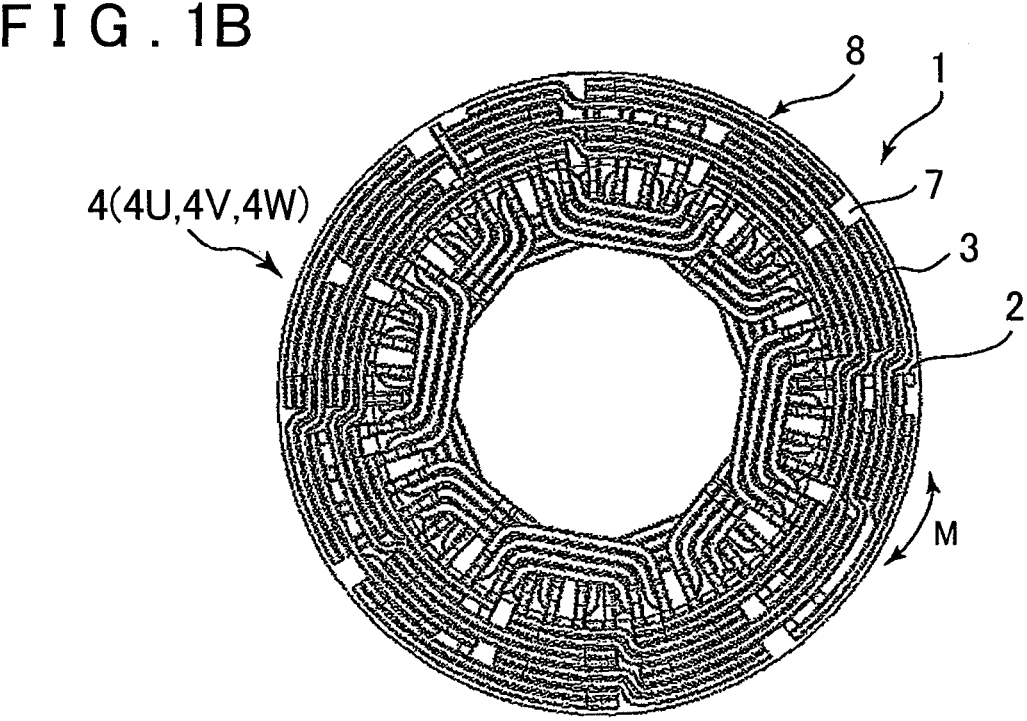

A first embodiment of the present invention will be described with reference to the drawings. First, a stator for a rotary electric machine (such as a motor and a generator) incorporating coils manufactured in accordance with the first embodiment will be described with reference to FIGS. 1 and 2. A stator 1 forms an electric motor (including a generator) together with a rotor. Such an electric motor is suitable as an electric motor (including a generator), in particular a brushless DC motor, serving as a drive source for electric vehicles and hybrid vehicles. As shown in FIGS. 1A and 1B, the stator 1 includes a stator core 2 formed by stacking a large number of thin silicon steel plates, and coils 4 formed by winding a magnet wire (conductor, winding) 3 made of a predetermined material. The stator core 2 has a ring shape, and includes a large number of slots 5, 5 opening radially inward and teeth 6, 6, which are formed alternately. The coils 4 (4U, 4V, 4W) for three phases U, V, W are wound by distributed winding through two slots 5, 5 separated at a predetermined pitch.

The magnet wire 3 is formed by a rectangular wire with a rectangular cross section, and includes a conductor made of copper or the like and an insulating coating made of an insulating resin or the like formed entirely around the conductor. In the coils 4U, 4V, 4W for the three phases formed by the wire 3, a plurality of (for example, four) wires 3 for the same phase are disposed side by side in the radial direction of the stator core 2 in the slots 5, 5 for the same phase, a plurality of wires 3 for the same phase are disposed side by side in the radial direction (or the axial direction) of the stator core 2 at a first-end side coil end portion 8 which projects from a first-end surface 7 of the stator core 2 on one side in an axial direction L of the stator core 2, and a plurality of wires 3 for the same phase are bent inward in the radial direction of the stator core 2 and disposed side by side in the radial direction of the stator core 2 at a second-end side coil end portion 10 which projects from a second-end surface 9 of the stator core 2 on the other side in the axial direction L.

Figure 2A:
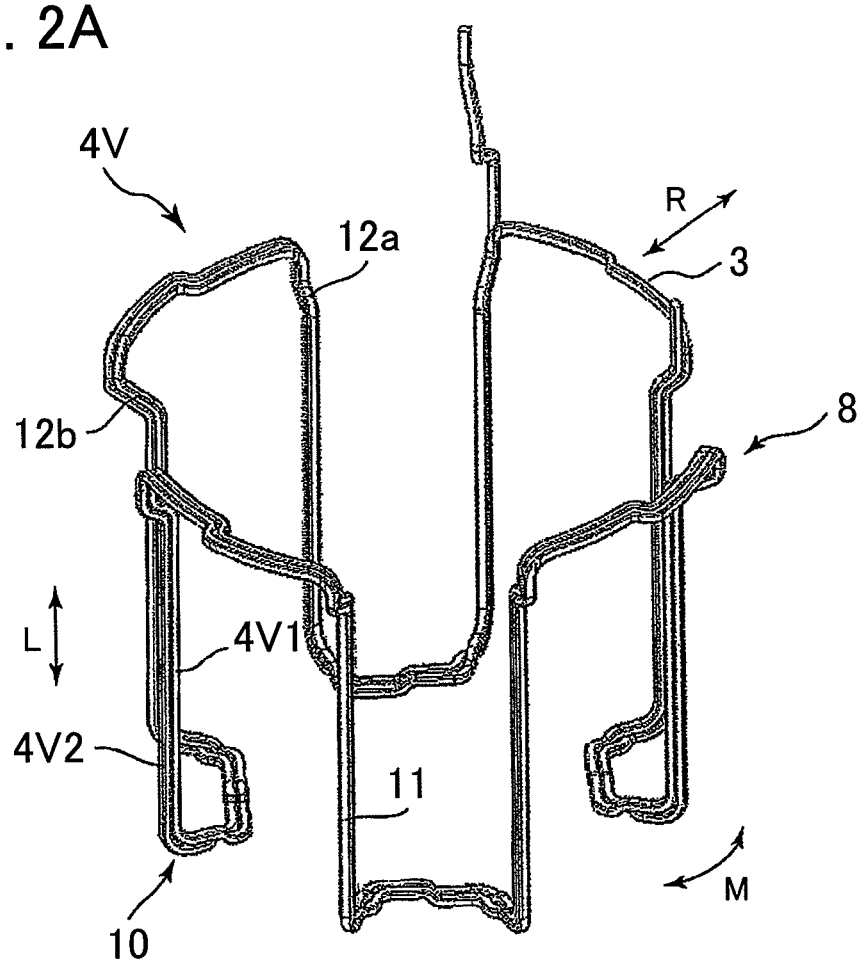
Figure 2B:
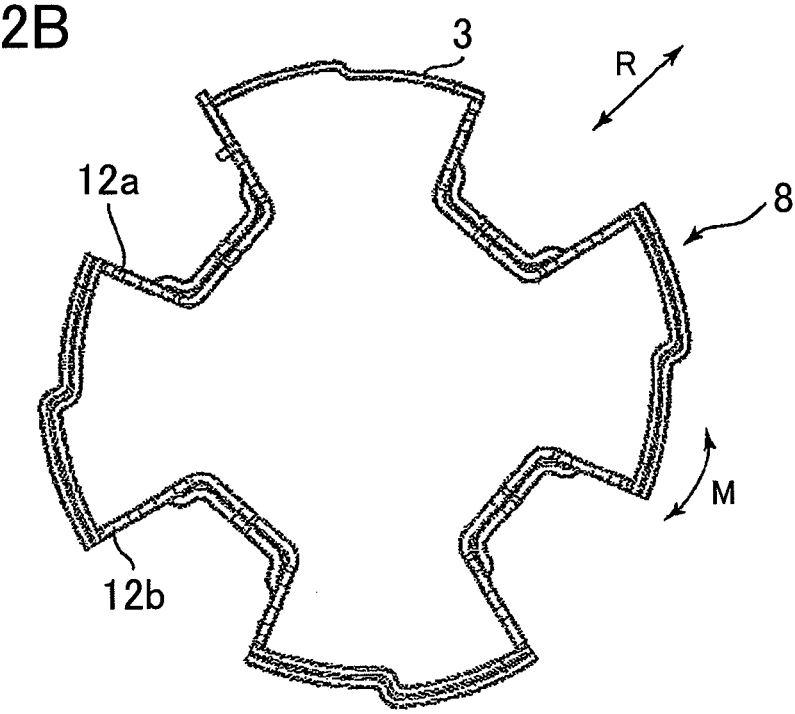
Figure 4:
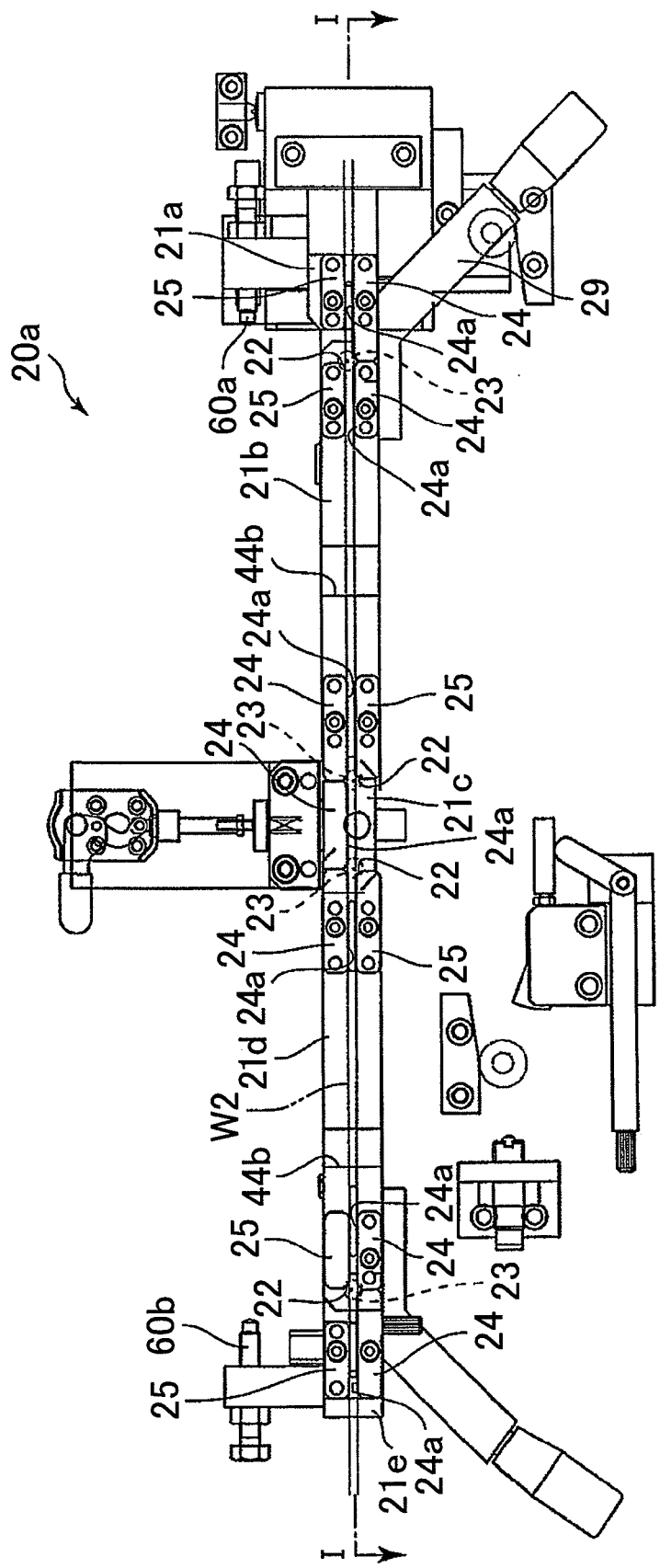
FIG. 4 is a plan view of a bending apparatus according to a first embodiment of the present invention.
Figure 5:
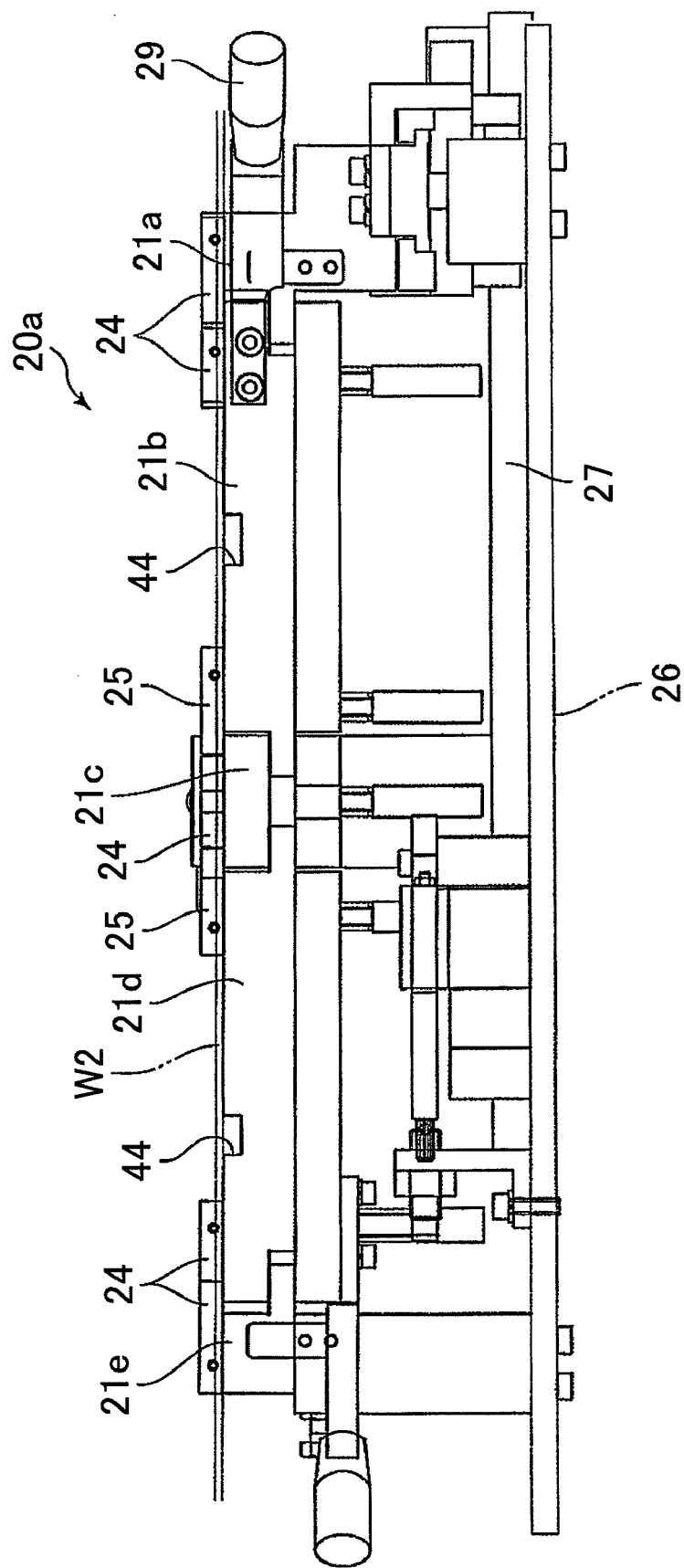
FIG. 5 is a view of the bending apparatus seen from the bottom of FIG. 4.

The coil 4V for the V-phase is illustrated as a representative example. As shown in FIGS. 2A and 2B, the coil 4V is formed by winding the wire 3 generally in two turns such that two sets of coils 4V1, 4V2 are disposed in the radial direction to occupy the same slot 5. Each set of coils 4V1, 4V2 include: slot conductor portions 11, 11 disposed in the slots 5, 5; a first-end side coil end portion 8 that projects from the first-end surface 7 of the stator core 2, and is bent outward in a radial direction R in a crank shape and extends in a circumferential direction M so as to couple the slot conductor portions 11, 11 separated at a predetermined interval; and a second-end side coil end portion 10 that projects from the second-end surface 9 of the stator core 2, and is bent inward in the radial direction R and extends in the circumferential direction M so as to couple the slot conductor portions 11, 11 separated at a predetermined interval.

The first-end side coil end portion 8 is bent in the radial direction R at the middle of its portion extending in the circumferential direction M into a generally crank shape. Therefore, a crank portion 12b connected to a portion of the first-end side coil end portion 8 extending in the circumferential direction M that is located on the outer side in the radial direction R is formed to be longer than a crank portion 12a connected to a portion of the first-end side coil end portion 8 extending in the circumferential direction M that is located on the inner side in the radial direction R. The second-end side coil end portion 10 is configured such that a first-turn portion and a second-turn portion overlap each other in the radial direction R at a distal end portion and in the axial direction L at a base end portion at which the first-turn and second-turn portions are bent to extend in the radial direction R. Therefore, the second-end side coil end portion 10 for the second turn is bent into a stepped shape so as to become narrower toward the inner side in the radial direction R. Also, the second-end side coil end portion 10 is bent in the axial direction L at the middle of its portion extending in the circumferential direction M into a generally crank shape. The other coils 4U, 4W are also formed in the same way. A plurality of respective types of coils are combined to obtain the stator 1 shown in FIGS. 1A and 1B discussed earlier. If coils 4 are formed as discussed above and appropriately combined with each other, the coils 4 can be incorporated into the stator core 2 in a space-saving manner as shown in FIGS. 1A and 1B.

The coil 4 discussed above is formed by applying a further bending process to a material (an intermediate material) W1 such as a rectangular wire formed to have a rectangular wave shape as shown in FIG. 3 to wind the material W1 in a plurality of turns (two turns in the illustrated example). The material W1 includes a plurality of straight portions 30, 30 extending in parallel with each other, and first-end side (upper side of FIG. 3) coupling portions 31a, 31b, 31c and second-end side (lower side of FIG. 3) coupling portions 32a, 32b provided alternately to couple first-side ends and second-side ends, respectively, of adjacent ones of the straight portions 30, 30. Intermediate portions of the straight portions 30, 30 form the slot conductor portions 11 discussed earlier. The first-end side coupling portions 31a to 31c and first-end portions of the straight portions 30, 30 form the first-end side coil end portion 8 discussed earlier to serve as a lead side for connection with a terminal from a power source or with other coils. The first-end side coupling portions 31a, 31a on the right side of FIG. 3 form the first turn of the coil 4 which is formed in two turns. The first-end side coupling portions 31c on the left side of FIG. 3 form the second turn of the coil 4. The first-end side coupling portion 31b between the first-end side coupling portions 31a, 31a and the first-end side coupling portions 31c, 31c forms a portion of the coil 4 between the first turn and the second turn, that is, a crossover portion at which the number of turns changes. Therefore, they have different lengths. The second-end side coupling portions 32a, 32b and second-end portions of the straight portions 30, 30 form the second-end side coil end portion 9 discussed earlier to serve as a non-lead side at which no connection with a terminal or the like is provided.

The first-end side coupling portions 31a to 31c are inclined with respect to the direction orthogonal to the straight portions 30, 30. Thus, of bent portions 33a, 33b at which the first-end side coupling portions 31a to 31c and the straight portions 30, 30 are connected, the angle of the bent portions 33a, 33a on the left side of FIG. 3 (the angle formed by the first-end side coupling portions 31a to 31c and the straight portions 30, 30) is larger than 90°, and the angle of the bent portions 33b, 33b on the right side of FIG. 3 is smaller than 90°. On the other hand, the second-end side coupling portions 32a, 32b are bent in a direction substantially orthogonal to the straight portions 30, 30. Bent portions 33c, 33c which are provided on the right side of FIG. 3 and at which the second-end side coupling portions 32a, 32a forming the first turn of the coil 4 and the straight portions 30, 30 are connected are formed by simply folding a wire. In contrast, bent portions 33d, 33d which are provided on the left side of FIG. 3 and at which the second-end side coupling portions 32b, 32b forming the second turn of the coil 4 and the straight portions 30, 30 are connected are formed to have a stepped shape in which the interval between the bent portions 33d, 33d becomes smaller toward the distal end. The bent portions 33d, 33d are formed to have the stepped shape described above in order to provide the coil 4 with a compact second-end side coil end portion 10 in the shape discussed earlier by preventing interference between the bent portions 33c, 33c and the bent portions 33d, 33d when the material W1 is wound into the coil 4.

Bending apparatuses 20a, 20b that are used to form the material W1 in the rectangular wave shape shown in FIG. 3 discussed above and a bending machine 40 including the bending apparatuses 20a, 20b will be described with reference to FIGS. 4 to 23. The bending apparatuses 20a, 20b are selectively used in accordance with the difference between the lengths of the second-end side coupling portions 32a, 32b discussed above. That is, the bending apparatus 20a is used to form the first turn of the coil 4, and the bending apparatus 20b is used to form the second turn of the coil 4. The bending apparatuses 20a, 20b repeatedly perform a bending process at four locations on the material W2 such as a straight rectangular wire before being bent which is fed successively.

Figure 6:
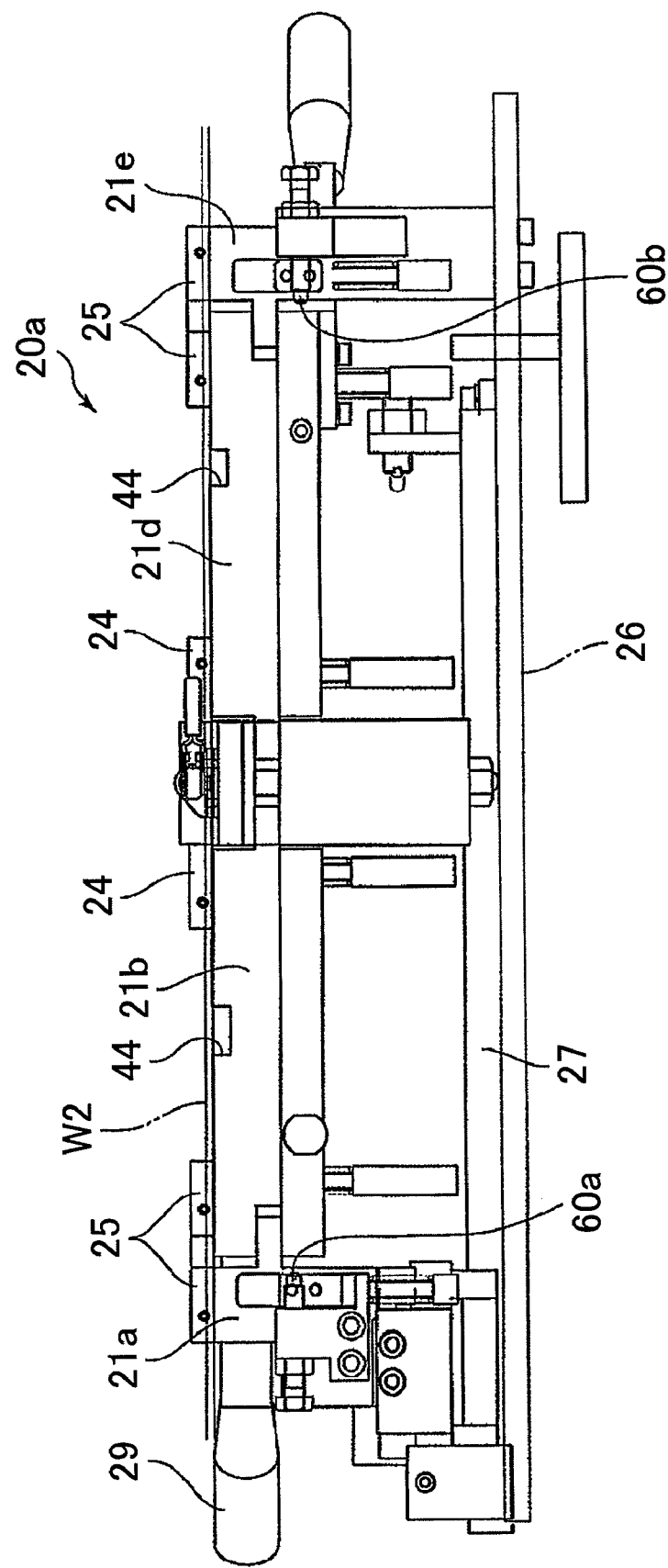
FIG. 6 is a view of the bending apparatus seen from the top of FIG. 4.
Figure 7:
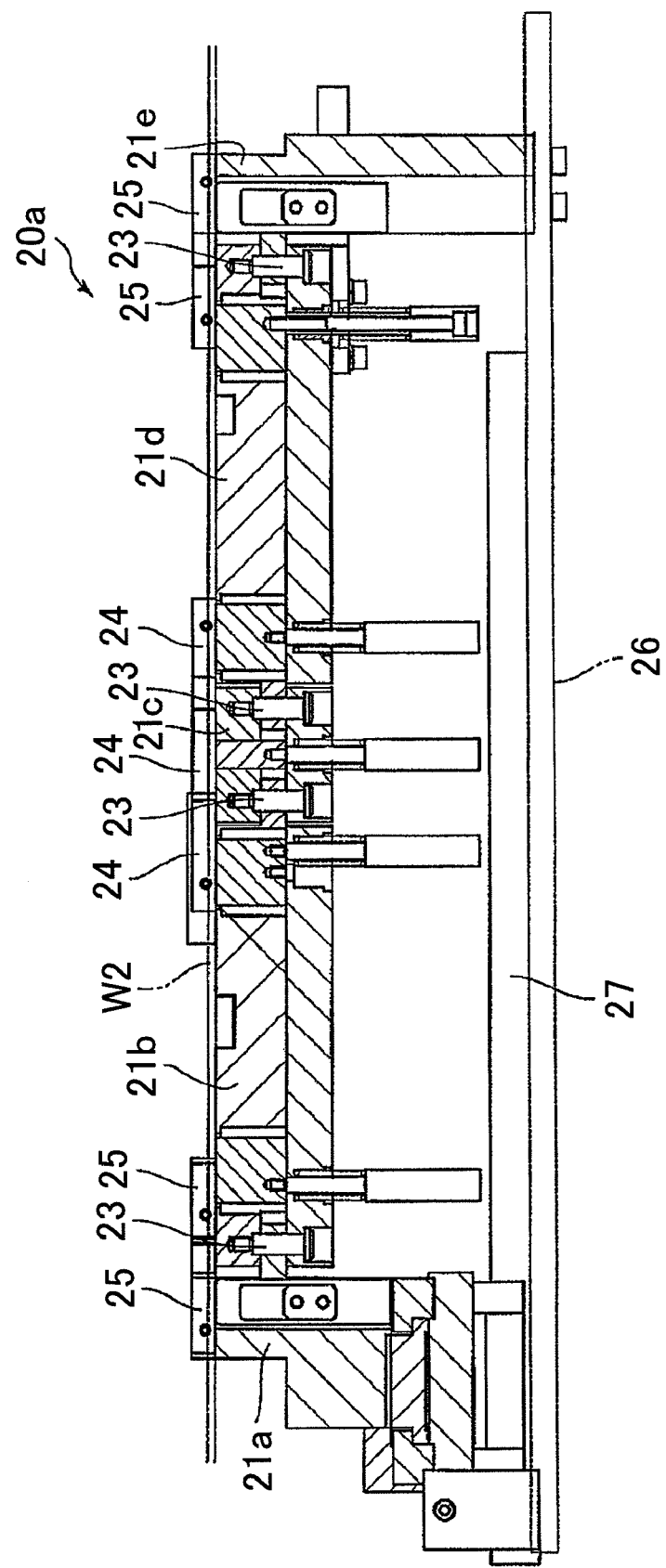
FIG. 7 is a I-I cross-sectional view of FIG. 4.

First, the bending apparatus 20a which forms the first turn of the coil 4 will be described with reference to FIGS. 4 to 11. In the case of the first embodiment, a bobbin (not shown) around which a sufficiently long material W2 is wound is disposed on the right side of the bending apparatus 20a in FIGS. 4 and 5 and on the left side of the bending apparatus 20a in FIGS. 6 and 7, and the material W2 is fed (supplied) from the bobbin along the left-right direction of each drawing, from right to left in FIGS. 4 and 5 and from left to right in FIGS. 6 and 7. Thus, the right side of FIGS. 4 and 5 and the left side of FIGS. 6 and 7 are the upstream side in the feeding direction, and the left side of FIGS. 4 and 5 and the right side of FIGS. 6 and 7 are the downstream side in the feeding direction.

The bending apparatus 20a includes five jigs 21a, 21b, 21c, 21d, 21e, a plurality of offset bending sections 22, 22, and so forth. The jigs 21a to 21e are coupled in series with each other so as to be turnable about respective turning shafts 23, 23. That is, the jig 21a disposed at the upstream end in the feeding direction and the jig 21b adjacent to the jig 21a are coupled to each other such that the jig 21b is turnable with respect to the jig 21a at the upstream end in the clockwise direction of FIG. 4. The jig 21b and the jig 21c at the center are coupled to each other such that the jig 21c at the center is turnable with respect to the jig 21b in the counterclockwise direction of FIG. 4. The jig 21c at the center and the jig 21d adjacent to the jig 21c on the downstream side in the feeding direction are coupled to each other such that the jig 21d is turnable with respect to the jig 21c at the center in the counterclockwise direction of FIG. 4. The jig 21d and the jig 21e disposed at the downstream end in the feeding direction are coupled to each other such that the jig 21d is turnable with respect to the jig 21e at the downstream end in the counterclockwise direction of FIG. 4. A bending process is performed on the material W2 by placing the material W2 on the jigs 21a to 21e and turning the jigs 21a to 21e with respect to each other.

To this end, the jigs 21a to 21e include suppression sections 24, 24 respectively fixed to the opposite side of the turning direction to suppress displacement of the material W2. That is, suppression surfaces 24a, 24a of the suppression sections 24, 24 are caused to contact a side surface of the material W2 in order to suppress displacement of the material W2 with respect to the jigs 21a to 21e during a bending process. The jigs 21a, 21b, 21d, 21e, excluding the jig 21c at the center, include retention sections 25, 25 respectively fixed at a position opposite the suppression sections 24, 24 across the material W2. The gap between the retention sections 25, 25 and the suppression sections 24, 24 is slightly larger than the width of the material W2 so that the material W2 is loosely held between the retention sections 25, 25 and the suppression sections 24, 24. The jigs 21b, 21d include suppression sections 24, 24 and retention sections 25, 25 respectively fixed separately at both ends. However, the suppression sections 24, 24 and the retention sections 25, 25 at both ends may be respectively integrated with each other. The jig 21c at the center may also be provided with a retention section.

The offset bending sections 22, 22 are disposed in one of a pair of jigs coupled to each other, of the five jigs 21a to 21e, at a location offset from the turning shafts 23, 23 to the turning side of the material W2 by a predetermined amount. In the case of the first embodiment, the offset bending sections 22, 22 are provided by forming the corners of the retention sections 25, 25 fixed at both ends of each of the jigs 21b, 21d on the side opposite the suppression sections 24, 24 into a partially cylindrical surface. The offset bending sections 22, 22 may be formed by providing a cylindrical member, for example, separately from the retention sections 25, 25. The offset bending sections 22, 22 are formed as a cylindrical surface with a radius of curvature that is substantially the same as the radius of curvature of the inner circumferential surface of the material W2 after a bending process. With the offset bending sections 22, 22 offset from the turning shafts 23, 23 by a predetermined amount, the material W2 can be bent by turning the jigs 21a to 21d without displacing the material W2 with respect to the jigs 21a to 21e.

Figure 9A:
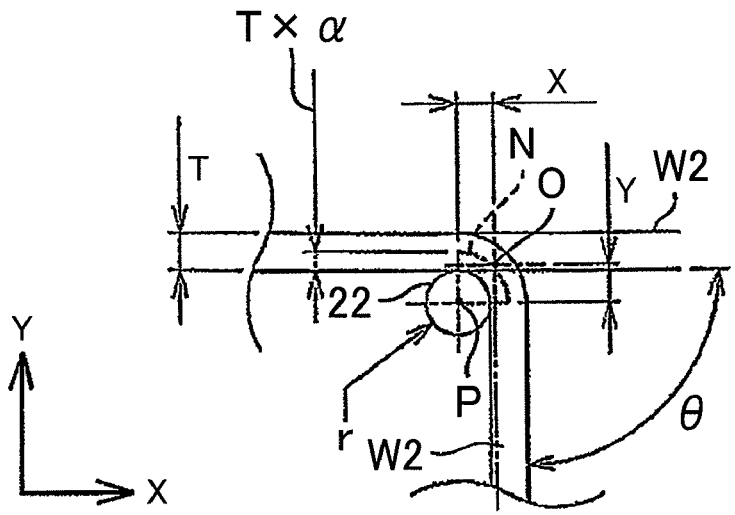
FIGS. 9A and 9B are schematic views illustrating the relationship between the bending center and the turning center of an offset bending section.
Figure 9B:
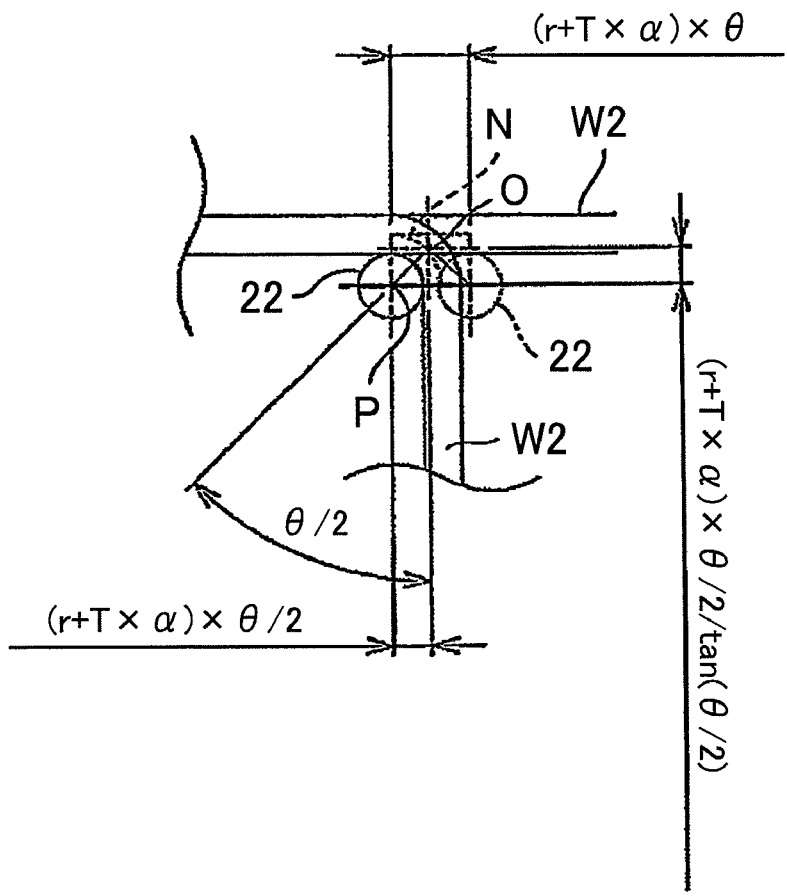

To this end, the offset amount of the offset bending sections 22, 22 with respect to the turning shafts 23, 23 is determined as follows. In the description below, the offset bending sections 22, 22 are assumed to be a cylindrical member. While only one bent portion of the material W2 will be described, all the bent portions have the same relationship. As shown in FIGS. 9A and 9B, when the bending angle of the material W2 is defined as $\theta$, the thickness of the material W2 (the diameter in the case where the material W2 has a circular cross section) is defined as T, the proportion of the distance from the center line N of the material W2 to the inner circumferential surface of the material W2 after a bending process to the thickness T is defined as $\alpha$, the radius of curvature of the offset bending section 22 is defined as r, and of values of the distance between the bending center P of the offset bending section 22 and the turning center O of the turning shaft 23, and assuming that the material W2 before being bent to the bending direction of the material W2 is shaped in a straight line, the value of the distance in the direction parallel to the direction of the straight line (X direction, which is the left-right direction of FIGS. 9A and 9B) is defined as X and the value of the distance in the direction orthogonal to the direction of the straight line (Y direction, which is the up-down direction of FIGS. 9A and 9B) is defined as Y, the bending center P is located with respect to the turning center O at a position at which the following formulas are satisfied at least after a bending process.

$$X=(r+T\times\alpha)\times\theta/2$$

$$Y=(r+T\times\alpha)\times\theta/2/\tan(\theta/2)$$

The above formulas will be described. First, if it is assumed that a bending process is performed on the material W2 with the bending center P and the turning center O coinciding with each other, the material W2 moves with respect to the jig by $(r+T\times\alpha)$ in terms of the position of the center line N. That is, the material W2 is pulled in by the length of the circumference of the bent portion of the center line N. Thus, in order to prevent the material W2 from being pulled in during a bending process, it is necessary to move the offset bending section 22 by $(r+T\times\alpha)\times\theta$ along the material W2 after the bending process compared to the offset bending section 22 before the bending process. As is clear from FIGS. 9A and 9B, it is not necessary to consider the moving distance of the offset bending section 22 in the Y direction. In this case, the offset bending section 22 is moved about the turning center O. Therefore, as is clear from FIG. 9B, the distance of the bending center P from the turning center O in the X direction is given as $(r+T\times\alpha)\times\theta/2$, which is half the moving distance of the offset bending section 22. When the distance of the bending center P from the turning center O in the X direction is obtained as described above, the distance of the bending center P from the turning center O in the Y direction is derived by the trigonometric functions as $(r+T\times\alpha)\times\theta/2/\tan(\theta/2)$.

Figure 8:
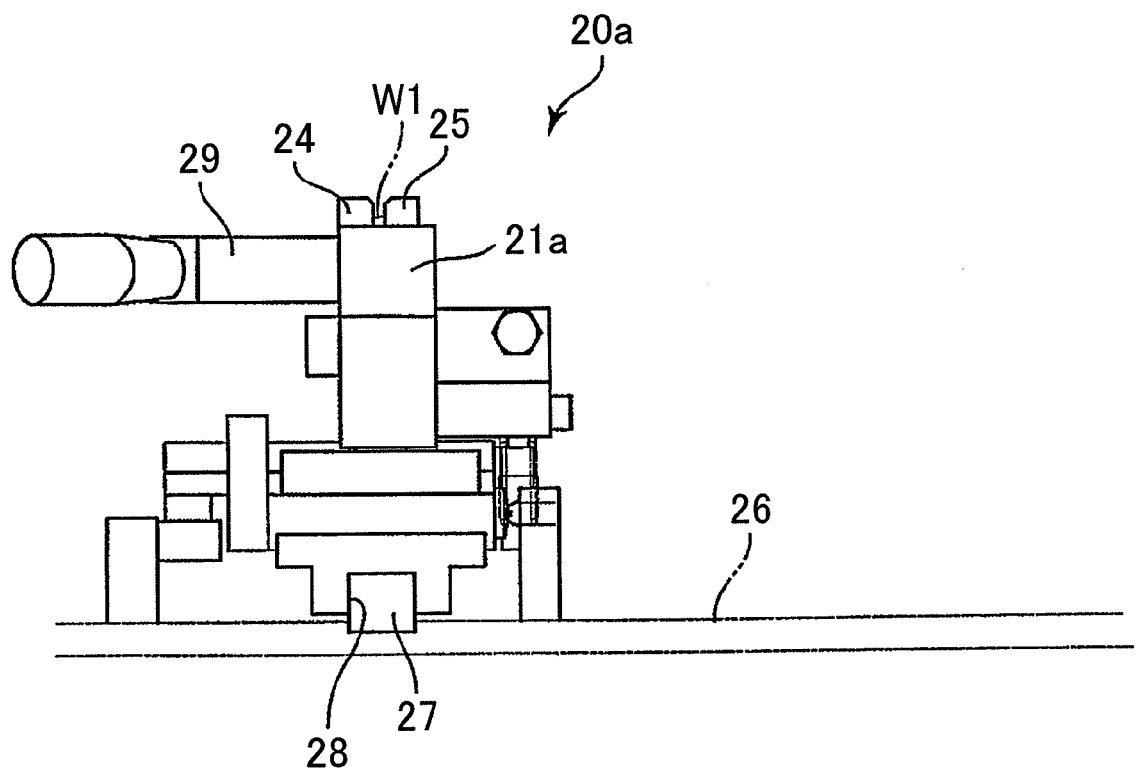
FIG. 8 is a view of the bending apparatus seen from the right of FIG. 4.

In the case of the first embodiment, in order to perform a bending process as discussed above, the jigs 21a, 21e at both ends, of the five jigs 21a to 21e, are disposed so as not to be turnable with respect to the feeding direction of the material W2 and so as not to be movable in the direction orthogonal to the feeding direction, and the jig 21a at the upstream end in the feeding direction is movable along the feeding direction. That is, the jig 21a at the upstream end in the feeding direction is disposed so as to be movable along a rail 27 fixed in the feeding direction on a platform 26 and in such an orientation that the gap between the suppression section 24 and the retention section 25 extends along the feeding direction. To this end, as shown in FIG. 8, a recess 28 is formed in the bottom surface the jig 21a along the feeding direction so that the rail 27 advances into the recess 28. As a result, the jig 21a is disposed so as to be movable along the rail 27 and so as not to be turnable with respect to the rail 27.

The jig 21e at the downstream end in the feeding direction is fixed downstream of the rail 27 in the feeding direction on the platform 26 so as not to be turnable and so as not to be movable in such an orientation that the gap between the suppression section 24 and the retention section 25 extends along the feeding direction. Thus, the jig 21a and the jig 21e are disposed on the same line along the feeding direction. With the jig 21a at the upstream end movable along the rail 27, the jigs 21a, 21e at both ends are movable closer to and away from each other along the feeding direction. While the jig 21e at the downstream end may also be moved, it is preferable that only the jig 21a at the upstream end is moved because an apparatus that performs the next bending process is disposed downstream of the bending apparatus 20a as discussed later. The jig 21e at the downstream end may be turnable about the turning shaft 23 depending on the shape of the downstream end of the material subjected to a bending process.

A handle 29 is fixed to the jig 21b adjacent to the jig 21a at the upstream end on the downstream side. By operating the handle 29, it is possible to apply to the jig 21b a force in the turning direction (clockwise direction of FIG. 4) about the turning shaft 23 for turning motion with respect to the jig 21a at the upstream end. By applying a force in the turning direction to the jig 21b as described above, a force for movement in one direction in the direction (upward direction of FIG. 3) orthogonal to the feeding direction is applied to the jig 21c at the center. Thus, the jig 21b serve as a working member that turns in the turning direction about the turning shaft 23 for turning motion with respect to the jig 21*a* at the upstream end to apply a force for movement in one direction in the orthogonal direction to the jig 21*c* at the center.

In the case where the bending apparatus 20*a* discussed above performs a bending process on the material W2, the jig 21*a* at the upstream end is moved along the rail 27 such that the jigs 21*a*, 21*e* at both ends move closer to each other. Along with this movement, the jigs 21*a* to 21*e* are turned with respect to each other in the respective directions discussed earlier until the jigs 21*a* to 21*e* are positioned as shown in FIG. 10 while applying to the jig 21*c* at the center a force for movement in one direction in the direction orthogonal to the feeding direction. In this way, a bending process is performed on the material W2 at four locations substantially at the same time. In the first embodiment, the handle 29, which is fixed to the jig 21*b* adjacent to the jig 21*a* at the upstream end, is operated to be turned in the clockwise direction of FIGS. 4 and 10 while moving the handle 29 downstream in the feeding direction. In this way, it is possible to slide the jig 21*a* at the upstream end downstream in the feeding direction, to turn the jig 21*b* in the clockwise direction with respect to the jig 21*a* at the upstream end, and to apply to the jig 21*c* at the center a force for movement in one direction in the direction orthogonal to the feeding direction. When the turning direction of the jig 21*b* and the moving direction of the jig 21*c* at the center are determined, the jigs 21*b*, 21*c*, 21*d* are turned with respect to each other in the directions discussed earlier by moving the jig 21*a* since the jig 21*e* at the downstream end is fixed. An actuator may be used to move the jig 21*a* and to turn the jig 21*b*.

During the bending process discussed above, a portion of the material W2 on the upstream side of the bending apparatus 20*a* is pulled by the jig 21*a*. Therefore, in the first embodiment, the material W2 supplied from the bobbin discussed earlier is relaxed between the bobbin and the bending apparatus 20*a* for allowance so that the material W2 is smoothly pulled by movement of the jig 21*a*. The material W2 may be supplied in such a way as to follow movement of the jig 21*a* by, for example, allowing the bobbin to rotate along with movement of the jig 21*a*. The material W2 may not necessarily be relaxed if movement of the jig 21*a* and supply of the material W2 can be performed smoothly in conjunction with each other.

Figure 11:
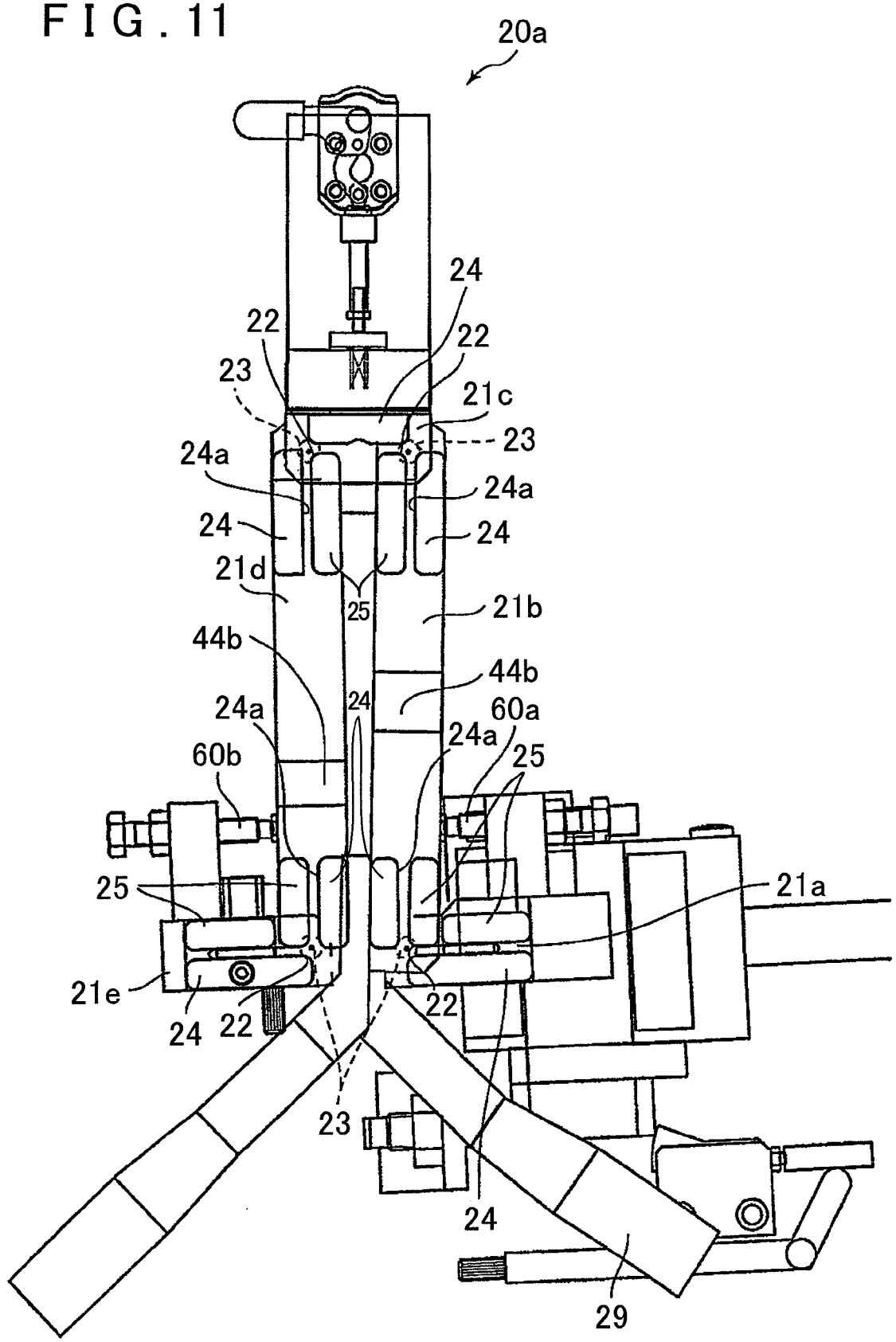
FIG. 11 is a plan view of the bending apparatus showing a state in which a further bending process has been performed in consideration of springback.

Further, in the first embodiment, the first-end side coupling portion 31 (31*a*, 31*b*, 31*c*) coupling the first-end portions of the straight portions 30, 30 is inclined with respect to the direction orthogonal to the pair of straight portions 30, 30 provided on both sides of the first-end side coupling portion 31 as discussed earlier so as to form the crank portions 12*a*, 12*b* with different lengths (see FIGS. 2 and 23) in the straight portions 30, 30 of the material W1 (see FIGS. 3 and 21) as discussed later. Thus, as shown in FIG. 10, the bending angles between the jigs 21*a*, 21*e* at both ends and the jigs 21*b*, 21*d* respectively adjacent to the jigs 21*a*, 21*e* are different from 90°. That is, the jigs 21*a* to 21*e* are turned until the angle formed by the jig 21*a* at the upstream end and the jig 21*b* becomes smaller than 90° and the angle formed by the jig 21*e* at the downstream end and the jig 21*d* becomes larger than 90°. To this end, the respective bending angles between the jigs 21*a*, 21*e* and the jigs 21*b*, 21*d* are restricted by restriction members 60*a*, 60*b*. When the respective bending angles between the jigs 21*a*, 21*e* and the jigs 21*b*, 21*d* are determined, the bending angles between the jig 21*c* and the jigs 21*b*, 21*d* are determined in accordance with the lengths of the jigs 21*b*, 21*d*. In the first embodiment, the lengths of the jigs 21*b*, 21*d* are the same as each other, and the bending angles between the jig 21*c* at the center and the jigs 21*b* and 21*d* are respectively substantially 90°. Also in the first embodiment, the jigs 21*a* to 21*e* are further turned as shown in FIG. 11 in consideration of springback of the material W2.

When a bending process is performed at four locations on the material W2, the portions subjected to the bending process are disengaged from the bending apparatus 20*a*. The material W2 is moved (fed) downstream in the feeding direction, and mounted on the bending apparatus 20*a* with portions to be processed next engaged in place. The process discussed above is performed again. By successively performing such processes, the first-turn portion of the coil 4, of the material W2 in the rectangular wave shape shown in FIG. 3 discussed earlier, is obtained. In this case, the feed amount of the material W2 is the same in the range of the first turn.

As shown in FIGS. 1A and 1B discussed earlier, a plurality of types of coils are provided in the stator core 2. The various types of coils have different circumferential lengths depending on the position in the radial direction at which the coils are disposed in the stator core 2. That is, the intervals between the straight portions are different. In the case where the coils are disposed in stator cores with different lengths in the axial direction (axial lengths), the lengths of the straight portions are also different. Therefore, it is necessary to prepare a plurality of sets of jigs for coils with different circumferential lengths or axial lengths (each of which corresponds to the intervals between the bent portions 33*a*, 33*b*, 33*c*, 33*d*). That is, as the five jigs 21*a* to 21*e* discussed earlier, a plurality of sets of jigs in which the length of at least one of the jigs 21*b* to 21*e*, excluding the jigs disposed at both ends, is different are prepared. This makes it possible to select which set of jigs to use in a bending process depending on the intervals between a plurality of the bent portions 33*a* to 33*d* (of the material W1) to be formed in the material W2 (intervals between adjacent ones of the straight portions 30, 30), or the lengths of the straight portions 30, 30.

For example, in the case where the (intermediate) material W1 in a generally rectangular wave shape (FIG. 3) is curved after a bending process to be wound in two or more turns, a combination of two or more sets of jigs in which the length of the jig 21*c* at the center is different is prepared as the five jigs. The change of the respective intervals between the bent portions 33*a* to 33*d* is adjusted by changing the set of jigs to use and varying the feed amount in setting the material W2 in a straight shape onto the five jigs 21*a* to 21*e* (bending apparatus 20*a*) depending on the number of turns of the material W1, and by varying the feed amount for a crossover portion at which the number of turns of the material W1 changes. The same jigs 21*b*, 21*d* can be used since the axial length is not varied.

In the case where the length of a crossover portion at which the number of turns of the material W1 changes is adjusted by varying the feed amount as described above, it is only necessary to prepare two sets of jigs in order to form the coil 4 by winding the material W1 in two turns, which reduces the number of sets of jigs to be prepared. Thus, in order to form various types of coils by winding a material in two turns, it is only necessary to prepare two sets of jigs for each type of coil to be formed. Therefore, it is possible to reduce the number of sets of jigs and hence the cost. In contrast, in the case where the length of a crossover portion is adjusted by replacing jigs, an additional set of jigs is required, and thus three sets of jigs are required to form the coil 4 by winding the material W1 in two turns.

In the case of the first embodiment, as discussed earlier, the coil 4 is formed by winding the material W1 in two turns. Thus, when the bending apparatus 20*a* has finished processing for the first turn as discussed above, first, the material W2 is moved in the feeding direction by the length of a crossover portion between the first turn and the second turn to adjust the length of the crossover portion. That is, the length of the first-end side coupling portion 31b shown in FIG. 3 is adjusted by the feeding amount. Then, the material W2 is disengaged from the bending apparatus 20a, which is replaced with the bending apparatus 20b (see FIGS. 16 to 20) for the second turn. The bending apparatus 20b processes the material W2 for the second turn. In the first embodiment, the bending apparatuses 20a, 20b are respectively disposed on the same platform 26, and the bending apparatuses 20a, 20b are replaced with each other by sliding the platform 26. Thus, before describing the bending apparatus 20b, the bending machine 40 including such components will be described with reference to FIGS. 12 to 15.

Figure 12:
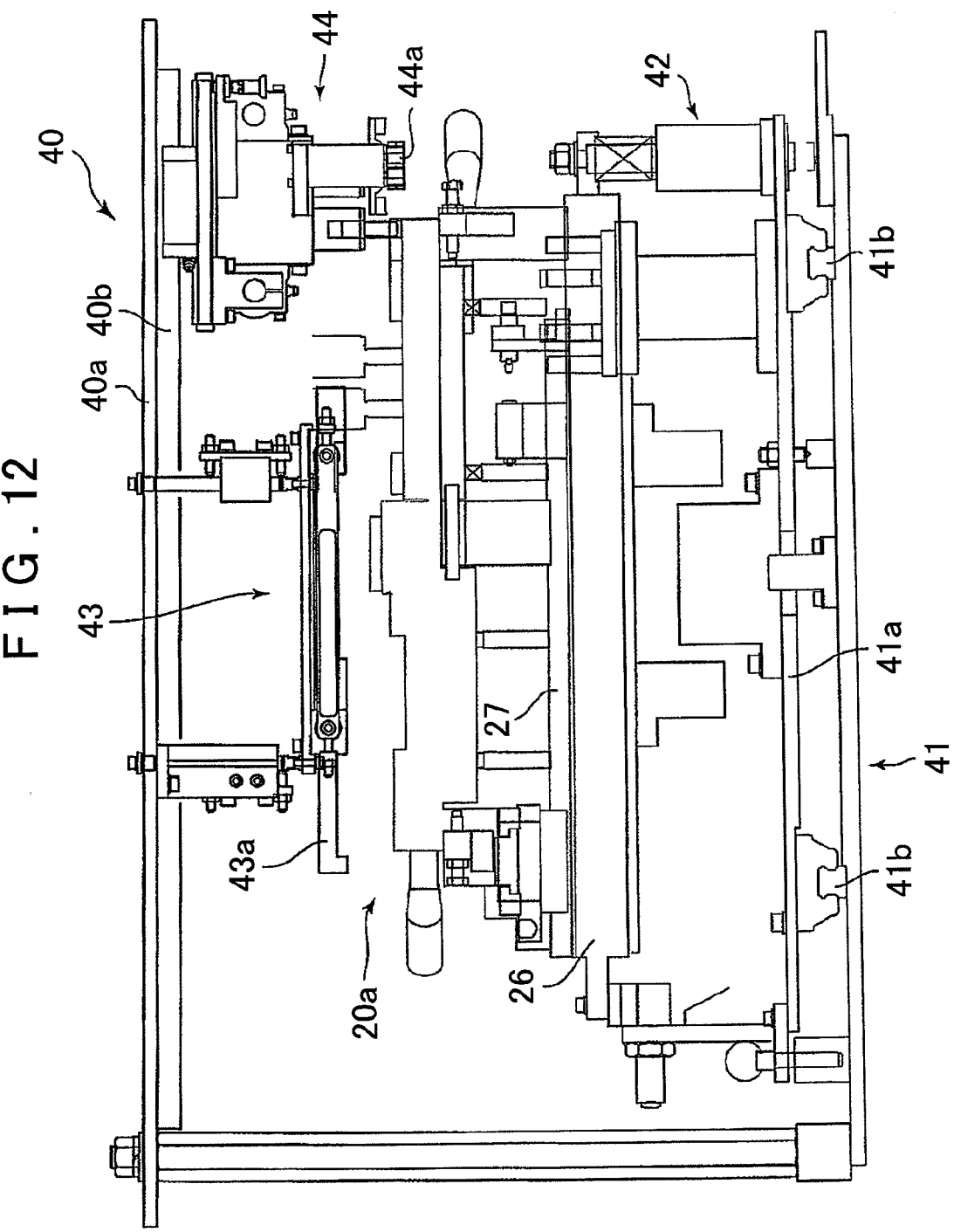
FIG. 12 is a schematic side view of a bending machine.
Figure 13:
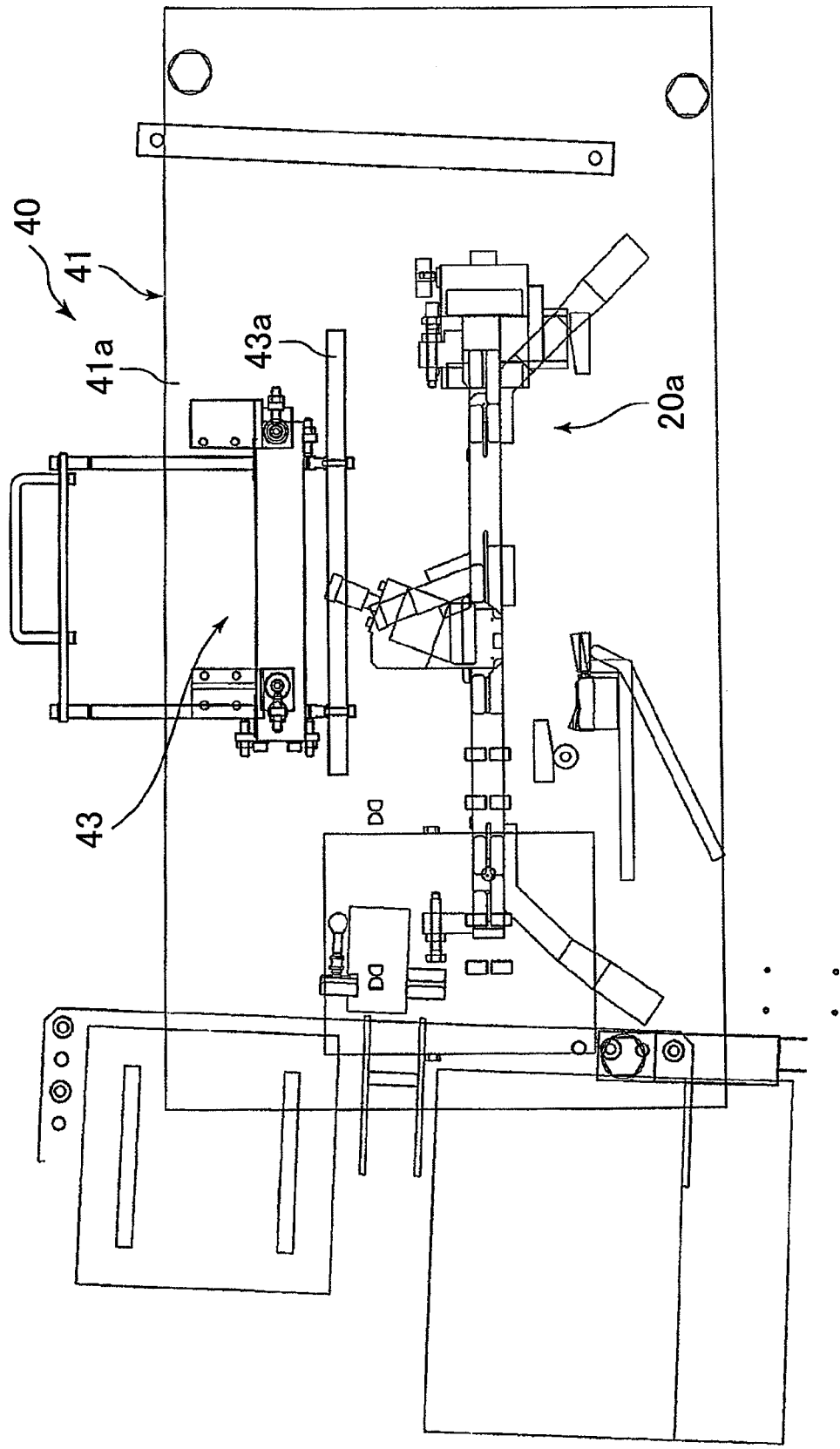
FIG. 13 is a schematic plan view showing the bending machine as partially omitted.
Figure 14:
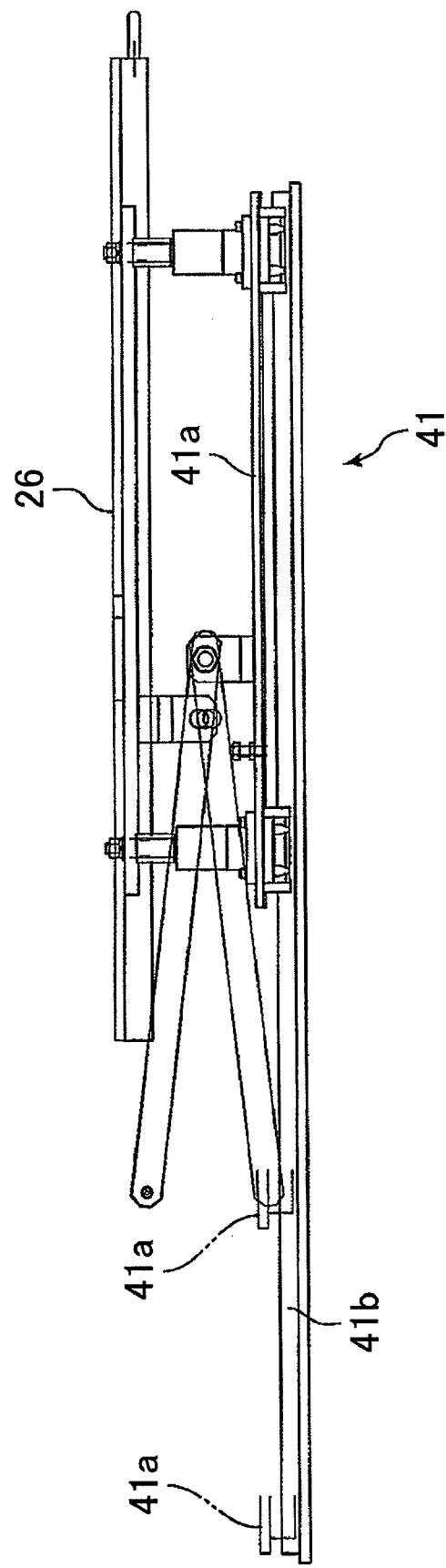
FIG. 14 is a schematic side view showing only components that slide a platform.
Figure 15:
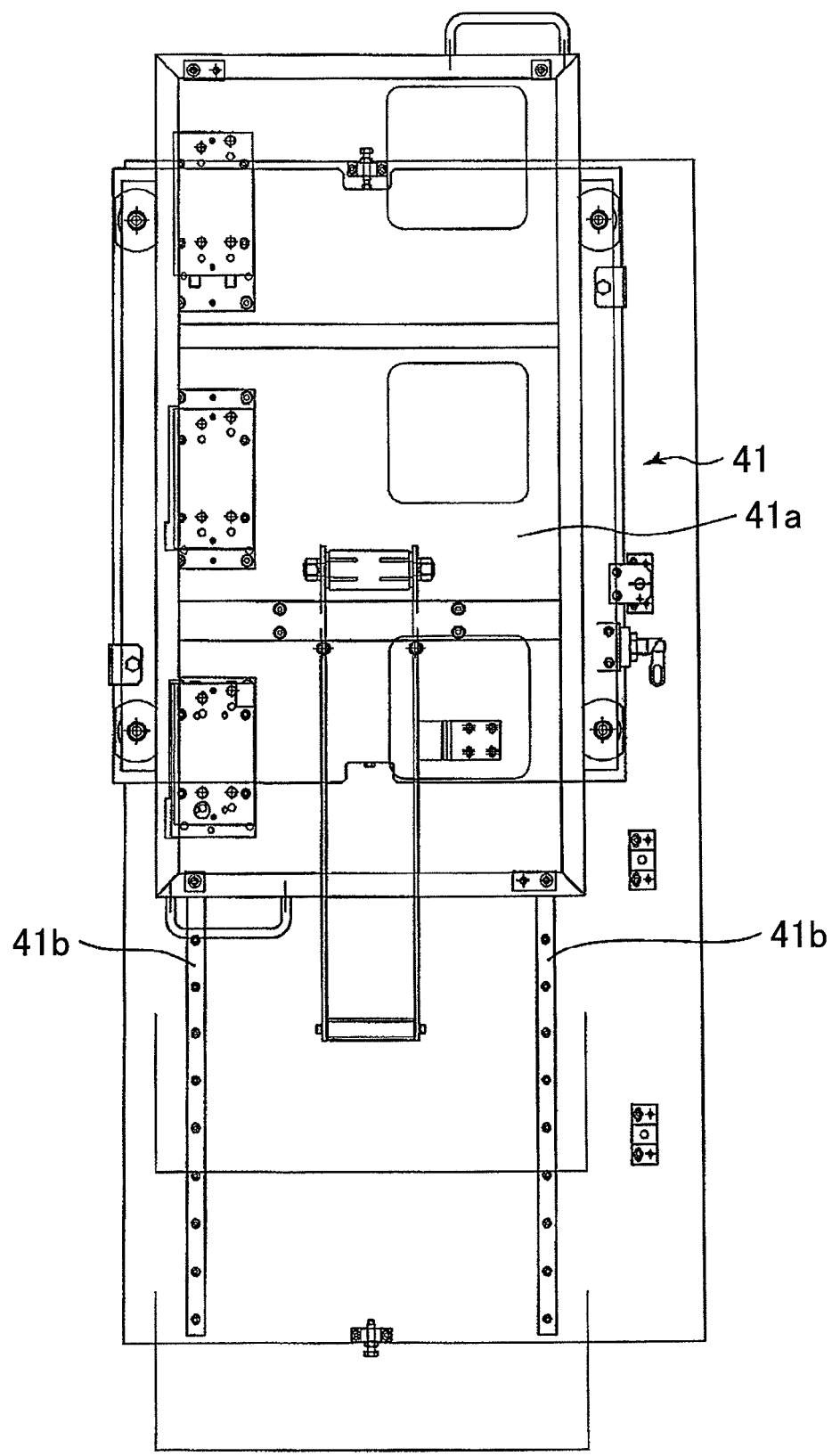
FIG. 15 is a schematic plan view showing the same components.
Figure 16:
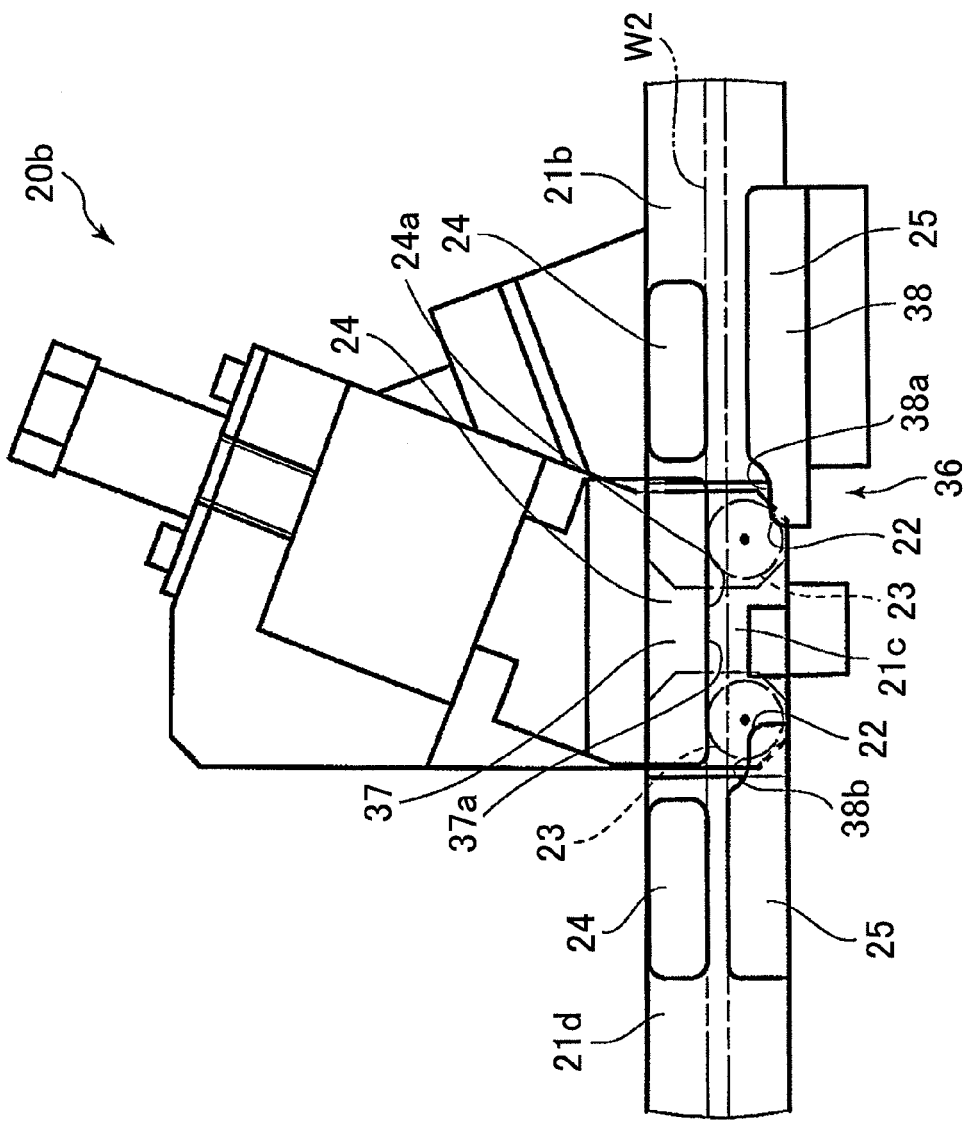
FIG. 16 is a plan view showing other example of the bending apparatus as partially omitted.

The bending machine 40 includes a platform 26 on which the bending apparatuses 20a, 20b are disposed as discussed above, a slide mechanism 41 that slides the platform 26, a displacement mechanism (ascending/descending mechanism) 42 that displaces the platform 26 together with the bending apparatuses 20a, 20b in the up-down direction of FIG. 12, a suppression mechanism 43 that sets the material W2 onto the bending apparatuses 20a, 20b, and a chuck mechanism 44 that grasps the material W2 to disengage the material W2 from the bending apparatuses 20a, 20b. As shown in FIGS. 12 and 14, the slide mechanism 41 includes a base 41a that supports the platform 26 and that is disposed so as to be slidable with respect to rails 41b, 41b. Thus, the platform 26 is movable in the front-back direction of FIG. 12, the up-down direction of FIGS. 13 and 15, and the left-right direction of FIG. 14 by moving the base 41a along the rails 41b, 41b manually or automatically using an actuator or the like. The displacement mechanism 42 moves (ascends and descends) the platform 26 with respect to the base 41a in the up-down direction of FIGS. 12 and 14 using an actuator such as a combination of a motor and a feed screw mechanism. The suppression mechanism 43 includes a suppression member 43a that is movable in the up-down direction of FIG. 13, and disposed above the bending apparatus 20a (20b) as shown in FIG. 12 and displaced to a side of the bending apparatus 20a as shown in FIG. 13. The chuck mechanism 44 is disposed so as to be movable along a rail 40b that is disposed on the lower surface of a ceiling plate 40a of the bending machine 40 and that extends in the feeding direction. With the chuck mechanism 44 positioned above the bending apparatus 20a and downstream of the bending apparatus 20a in the feeding direction, a chuck 44a grasps the material W2. To this end, a groove 44b (see FIG. 4, for example) into which the chuck 44a can advance is formed in the jig 21d of the bending apparatus 20a.

In the bending machine 40 discussed above, setting/removal of a coil onto/from the bending apparatus 20a (20b) and replacement between the bending apparatus 20a and the bending apparatus 20b are performed as follows. First, the slide mechanism 41 places the bending apparatus 20a at a position along the feeding direction of the material W2. At this time, the platform 26 is positioned below the material W2. Then, the suppression member 43a of the suppression mechanism 43 is placed above the material W2. In this state, the displacement mechanism 42 ascends the platform 26 together with the bending apparatus 20a. In this way, the material W2 is placed in the gap between the suppression section 24 and the retention section 25 of the jigs 21a to 21e of the bending apparatus 20a with the suppression member 43a pushing the material W2 from above. At this time, the jigs 21a to 21e are arranged in a straight line. After the suppression member 43a is retracted, the bending apparatus 20a performs a bending process. Then, the chuck mechanism 44 is moved to a predetermined position, and the chuck 44a grasps the material W2 after the bending process. In this state, the displacement mechanism 42 descends the platform 26 together with the bending apparatus 20a. In this way, the material W2 is removed from the bending apparatus 20a. In the case where the material W2 is continuously processed by the bending apparatus 20a, the material W2 is fed by a predetermined amount to repeat the steps discussed above. On the other hand, in the case where the material W2 is subjected to a bending process performed by the bending apparatus 20b, the slide mechanism 41 moves the platform 26 to place the bending apparatus 20b at a position along the feeding direction of the material W2. Then, the same steps as in the case discussed above are repeatedly performed.

Next, the bending apparatus 20b will be described with reference to FIGS. 16 to 20. As discussed earlier, the bending apparatus 20b processes the (intermediate) material W1 in the rectangular wave shape (FIG. 3) for the second turn. In the second-end side coupling portions 32b, 32b of the material W1 for the second turn, as discussed earlier, the bent portions 33d, 33d are formed to have a stepped shape. Therefore, the bending apparatus 20b is different from the bending apparatus 20a discussed earlier in the structure of its portions that form the stepped shape and in the length of the jig 21c at the center, and is the same as the bending apparatus 20a in the structure of other portions. Thus, in the description below, the portions with different structures are described mainly, and the other portions with the same structure as the bending apparatus 20a are not described or illustrated or are described and illustrated briefly.

The bending apparatus 20a includes a step shaping member 36 that forms a stepped portion 35 (FIG. 19) at a predetermined portion of the material W2 before a bending process is performed on the material W2 by the five jigs 21a, 21b, 21c, 21d, 21e (see FIG. 3, for example, for the jig 21a and the jig 21e). The step shaping member 36 includes a first pressing member 37 and a second pressing member 38 disposed so as to be displaceable in a direction inclined with respect to the extending direction of the material W2. Both the pressing members 37, 38 are disposed on opposite sides of each other across the material W2 and at positions shifted in the feeding direction of the material W2 (left-right direction of FIGS. 16 to 20).

In the first embodiment, the first pressing member 37 is implemented by the suppression member 24 of the jig 21c at the center, and this suppression member 24 is disposed so as to be displaceable with respect to the jig 21c. The suppression surface 24a of the suppression member 24 serves as a pressing shaping member 37a having a shape matching the shape of the stepped portion 35. The second pressing member 38 is implemented by the retention section 25 of the jig 21b, which is adjacent to the jig 21c at the center on the upstream side in the feeding direction (right side of FIGS. 16 to 20), and this retention section 25 is disposed so as to be displaceable with respect to the jig 21b. A step 38a that matches a bent portion 35a (FIG. 19) on the upstream side of the stepped portion 35 is formed at a portion of the retention section 25 at its downstream end (right side of FIGS. 16 to 20) and shifted upstream of the offset bending section 22. Also, a step 38b that matches a bent portion 35b (FIG. 19) on the downstream side of the stepped portion 35 is formed at a portion of the retention section 25 of the jig 21d, which is adjacent to the jig 21c at the center on the downstream side in the feeding direction, at the upstream end of the retention section 25 and shifted downstream of the offset bending section 22. That is, the steps 38a, 38b are formed at positions opposite the first pressing member 37 across the material W2 and shifted upstream or downstream in the feeding direction.

Figure 17:
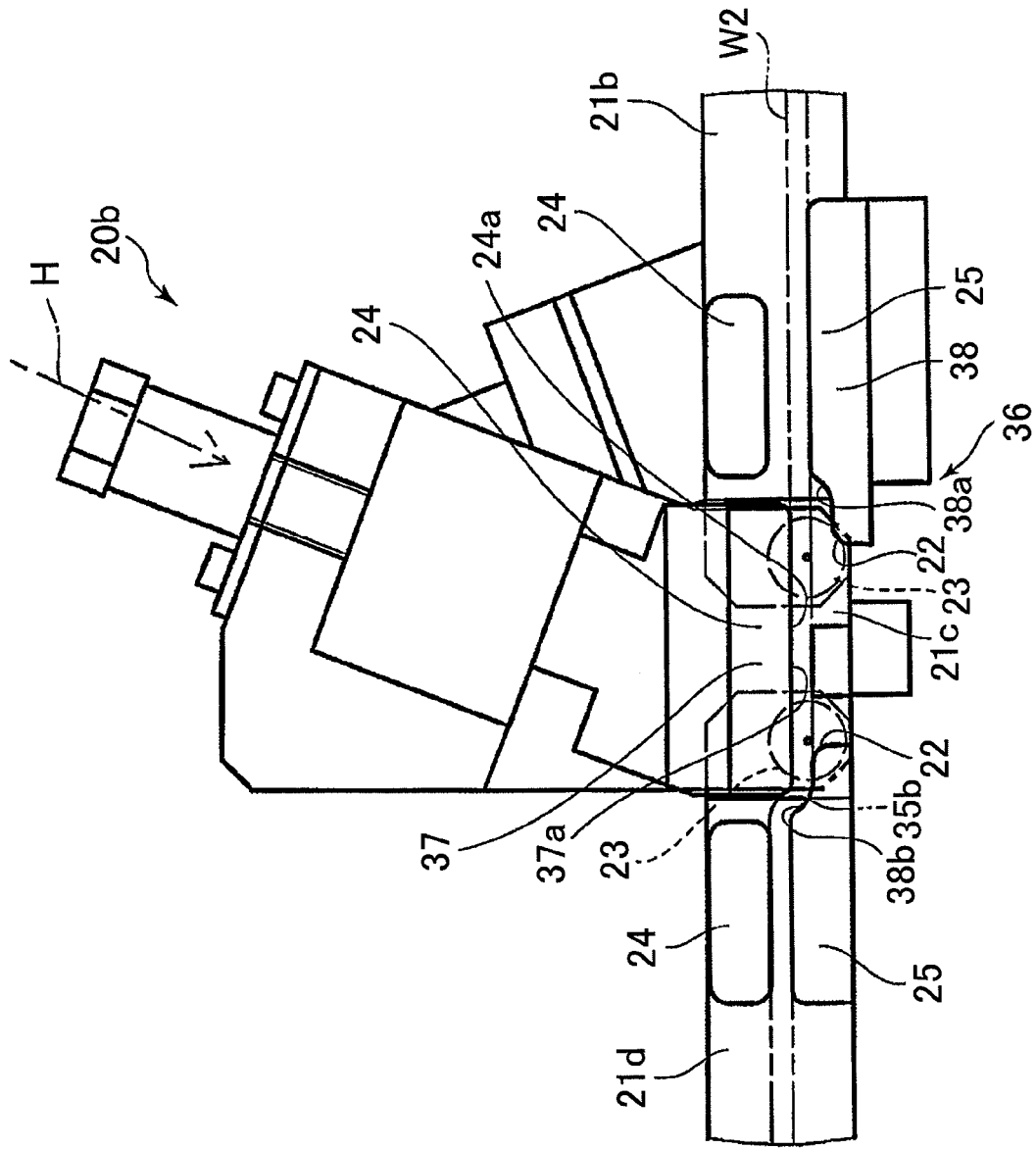
FIG. 17 shows a first step of forming a stepped portion in a material using the other example of the bending apparatus, which is similar to FIG. 16.
Figure 18:
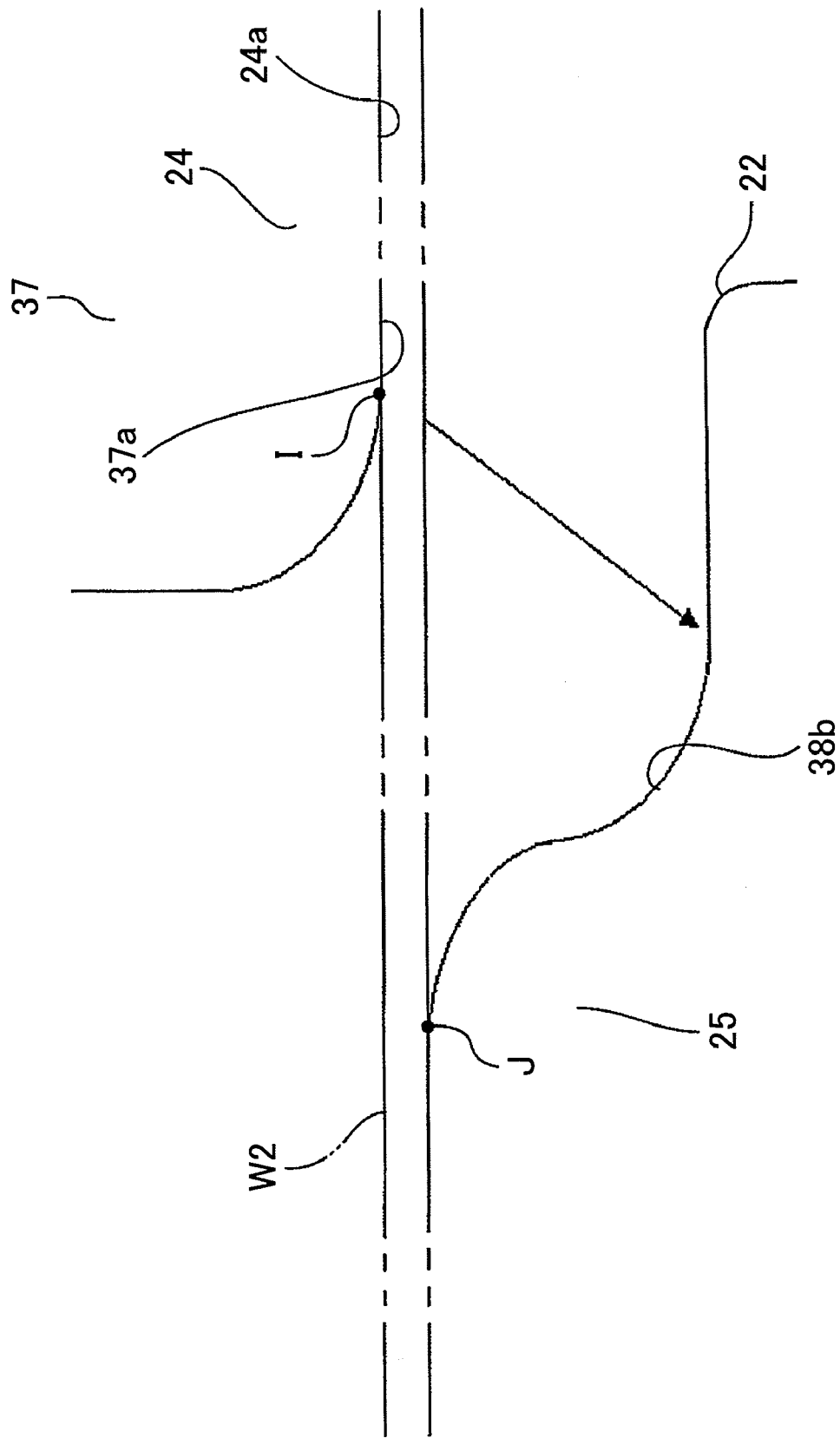
FIG. 18 is an enlarged view showing a main part of the portion formed by the first step.
Figure 19:
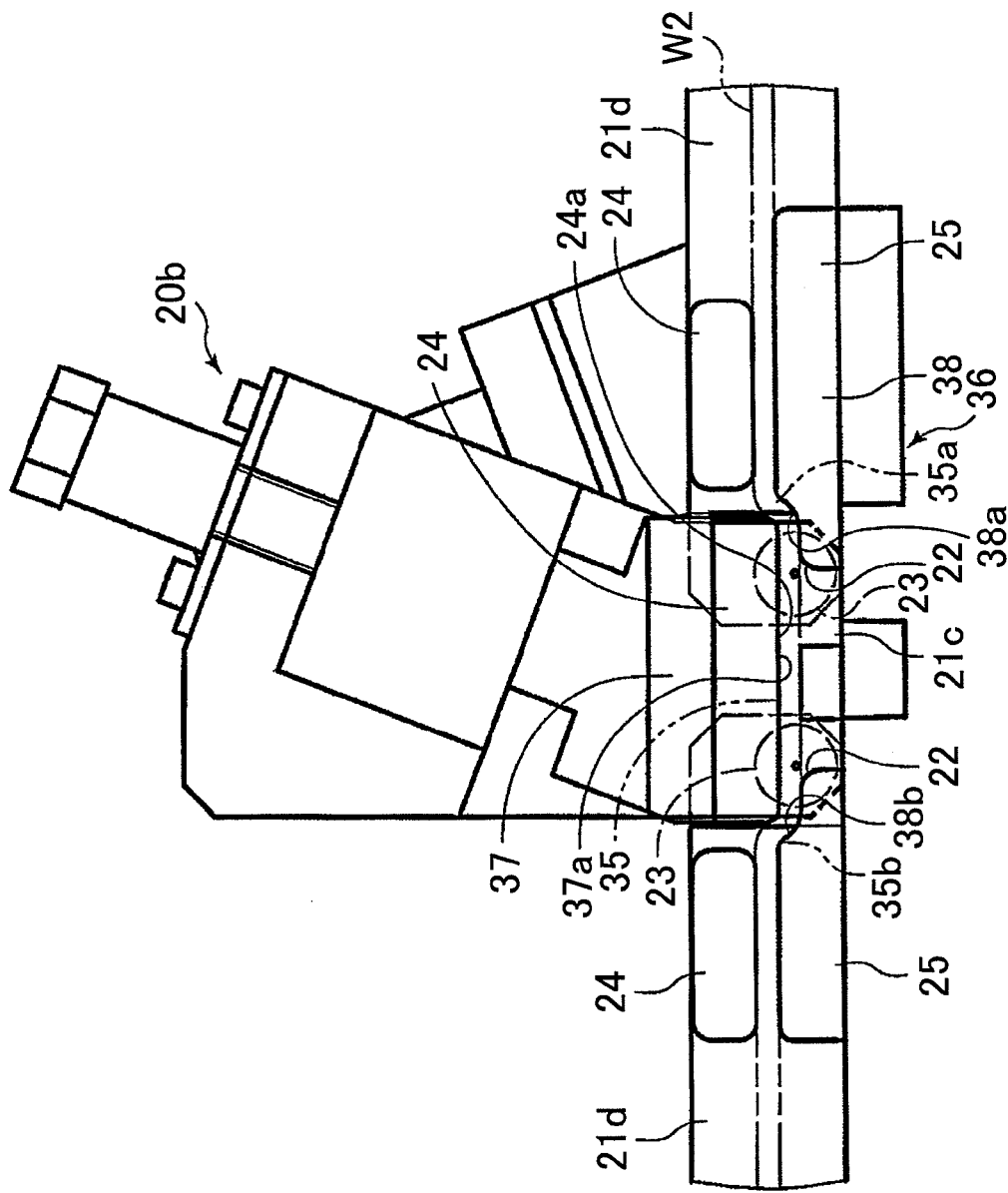
FIG. 19 shows a second step of forming a stepped portion in a material using the other example of the bending apparatus, which is similar to FIG. 16.

Both the pressing members 37, 38 discussed above respectively press the material W2 in a direction inclined with respect to the extending direction of the material W2 and containing a component oriented downstream in the feeding direction of the material W2. Thus, the stepped portion 35 is formed at a predetermined portion of the material W2 while preventing the material W2 from being pulled in from the downstream side in the feeding direction. That is, first, as shown in FIG. 17, the first pressing member 37 (the suppression section 24 of the jig 21c) is displaced (in the direction of the arrow H) toward the step 38b formed at a position shifted upstream in the feeding direction at a position opposite the first pressing member 37 across the material W2. Thus, the material W2 is deformed between the first pressing member 37 and the step 38b. At this time, as shown in FIG. 18, the first pressing member 37 is moved in the direction of the arrow toward the step 38b, and this direction is restricted by the relationship with frictions at a contact point I between the pressing shaping member 37a of the first pressing member 37 and the material W2 and at a contact point J between the retention section 25 formed with the step 38b and the material W2 such that substantially no slipping occurs at the contact points I, J. Then, as shown in FIG. 19, the second pressing member 38 (the retention section 25 of the jig 21b) is displaced toward the first pressing member 37 to deform the material W2 between the first pressing member 37 and the step 38a of the second pressing member 38 in order to form the stepped portion 35.

Both the pressing members 37, 38 are moved manually or automatically using an actuator or the like. In the case where the pressing members 37, 38 are moved manually, for example, the moving direction of both the pressing members 37, 38 is restricted by concave-convex fitting with the jig 21c and the jig 21b, respectively. Then, screws screwed into nut members respectively fixed to the jig 21c and the jig 21b are rotated to move the first pressing member 37 and the second pressing member 38 along the concave-convex fitting discussed above. In the case where the pressing members 37, 38 are moved automatically, for example, the screws discussed above are rotated by motors to move both the pressing members 37, 38.

Figure 20:
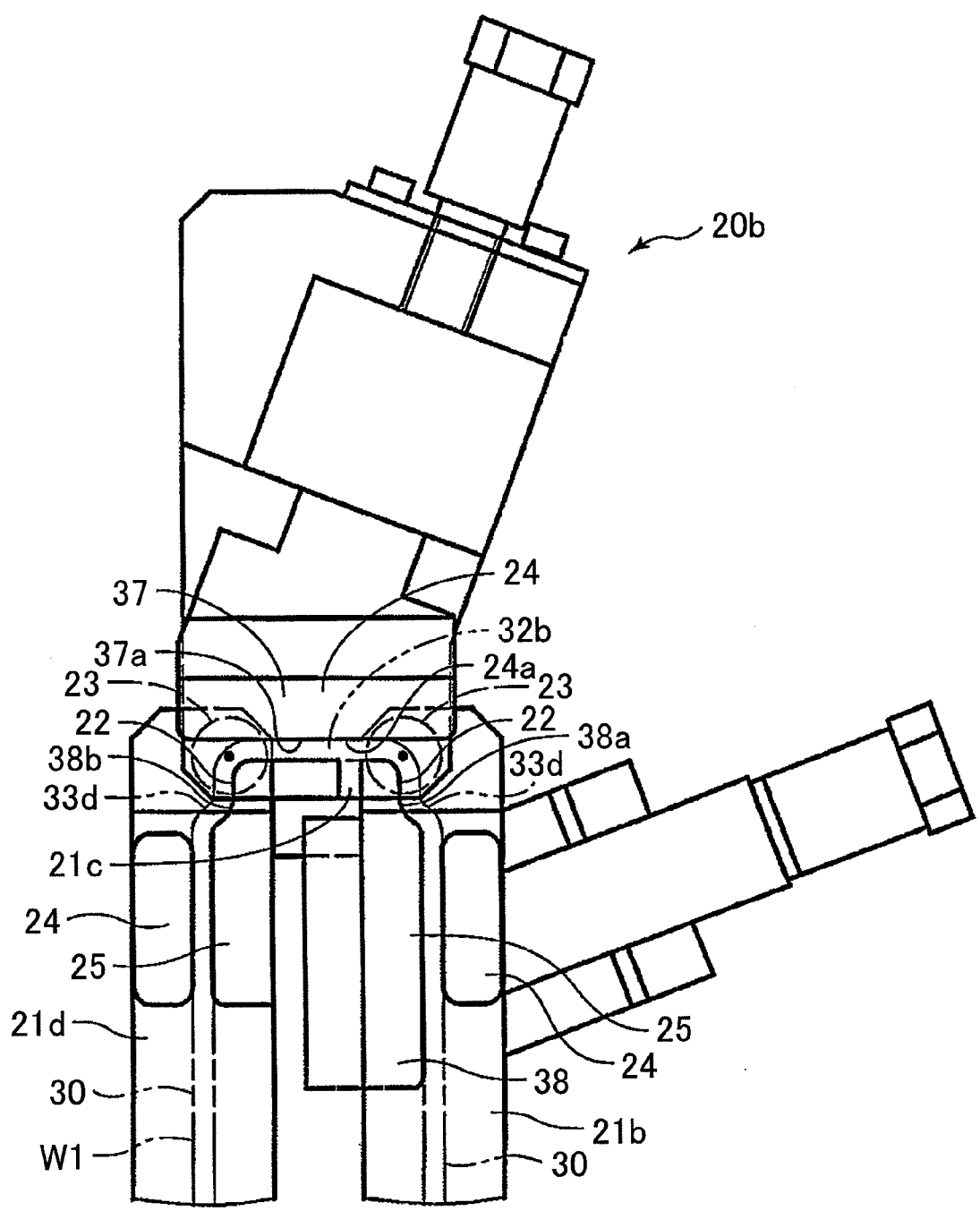
FIG. 20 shows a step of bending the material to form the stepped portion, which is similar to FIG. 16.

When the stepped portion 35 is formed in the material W2 as discussed above, a bending process is performed on the material W2 as shown in FIG. 20 by moving the jig 21a at the upstream end along the feeding direction and turning the jigs 21a to 21e with respect to each other as in the bending apparatus 20a discussed earlier. In the first embodiment, the offset bending sections 22 which bend the material W2 by turning the jig 21c with respect to the jig 21b and the jig 21d are respectively provided in the stepped portion 35, that is, between the bent portions 35a, 35b. Therefore, portions close to both ends of the stepped portion 35 are bent by a bending process performed by the jigs 21a to 21e, and the bent portions 33d, 33d of the material W1 are formed to have a stepped shape as shown in FIGS. 3 and 20. The offset bending section 22 formed in the retention section 25 of the jig 21b is disposed at a regular position at which the material W2 is not pulled in with the retention section 25 serving as the second pressing member 38 moved toward the first pressing member 37 as discussed above.

Next, a bending method and a bending apparatus used to form crank portions 12a, 12b with different lengths on the first-end side of the straight portions 30, 30 of the (intermediate) material W1 formed to have a rectangular wave shape by the bending apparatuses 20a, 20b as discussed above will be described with reference to FIGS. 21 to 27. While a first-end side coupling portion 31 (31a, 31b, 31c) and part of a pair of straight portions 30, 30 coupled by the first-end side coupling portion 31 are shown as an example in FIGS. 21 to 27, other portions are formed in the same way. First, the bending method will be described with reference to FIGS. 21 to 23.

Figure 23A:
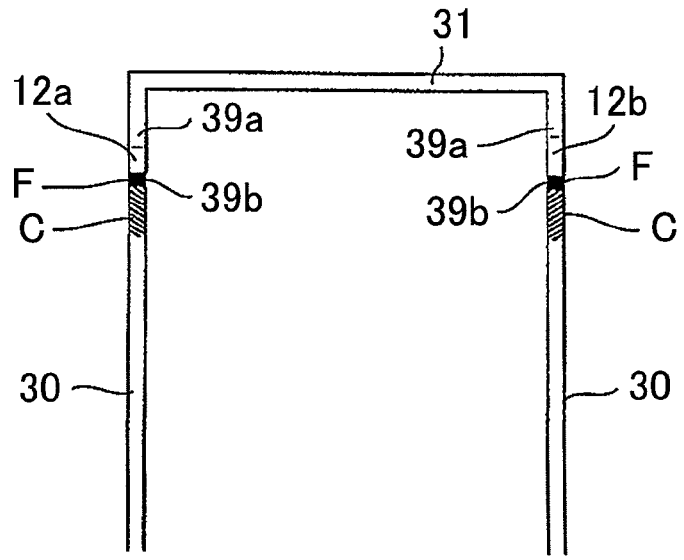

In the first embodiment, as described earlier in relation to FIGS. 1 and 2 discussed earlier, in order to bend the first-end side coil end portion 8 of the coil 4 in the radial direction R at the middle of its portion extending in the circumferential direction M into a generally crank shape, crank portions 12a, 12b with different lengths are formed in both the straight portions 30, 30. That is, a pair of folded portions 39a, 39b bent in directions opposite to each other are formed in each of both the straight portions 30, 30 so that the pair of folded portions 39a, 39b of the left straight portion 30 form the crank portion 12a and the pair of folded portions 39a, 39b of the right straight portion 30 form the crank portion 12b as shown in FIG. 23A. The length between the first-end side coupling portion 31 and the folded portion 39b in one of the straight portions 30 on the second-end side is different from the length between the first-end side coupling portion 31 and the folded portion 39b in the other of the straight portions 30 on the second-end side. In the first embodiment, the right crank portion 12b is longer than the left crank portion 12a as shown in FIG. 23A.

Figure 21A:
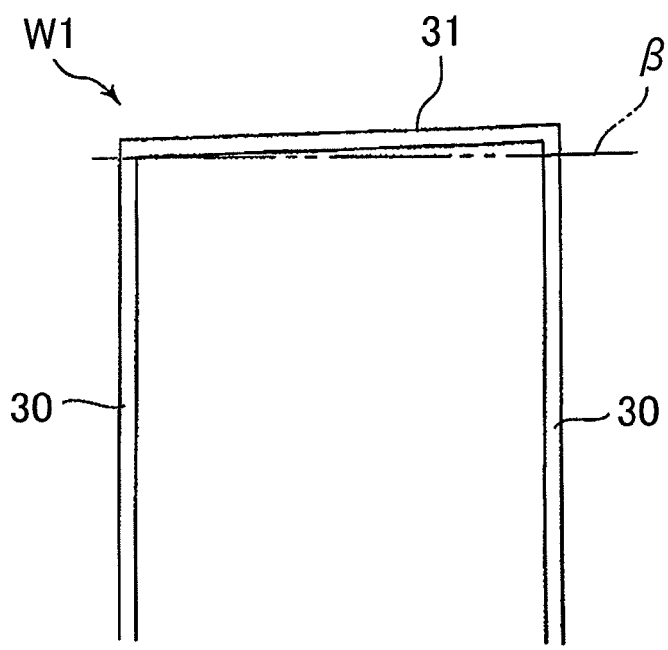
Figure 21B:
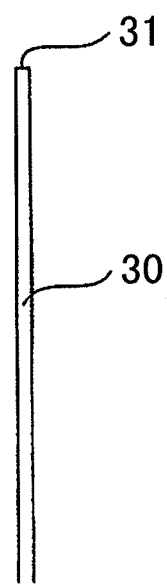
Figure 21C:
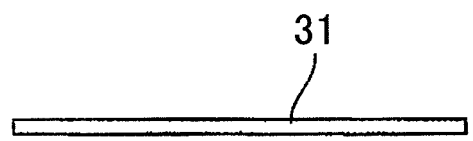

In order to efficiently form the crank portions 12a, 12b with different lengths, in the first embodiment, the material W1 is formed as shown in FIGS. 21A to 21C by the steps discussed above. That is, the bending apparatuses 20a, 20b discussed earlier successively form a plurality of straight portions 30, 30 extending in parallel with each other and a first-end side coupling portion 31 and second-end side coupling portions 32a, 32b (FIG. 3) provided alternately to couple first-side ends and second-side ends, respectively, of adjacent ones of the straight portions 30, 30 to obtain a material W1. In this process, the material W1 is formed with the first-end side coupling portion 31 inclined with respect to a direction 13 orthogonal to a pair of the straight portions 30, 30 provided on both sides of the first-end side coupling portion 31. This inclination depends on the difference between the lengths of the pair of folded portions 39a, 39b, that is, the crank portions 12a, 12b, to be respectively formed in the straight portions 30, 30. In the case of the illustrated example, the right crank portion 12b is longer than the left crank portion 12a as shown in FIG. 23A. Therefore, as shown in FIGS. 21A to 21C, the first-end side coupling portion 31a is inclined upward from left to right of FIG. 21A in accordance with the difference between the lengths of the crank portions 12a, 12b.

Figure 22A:
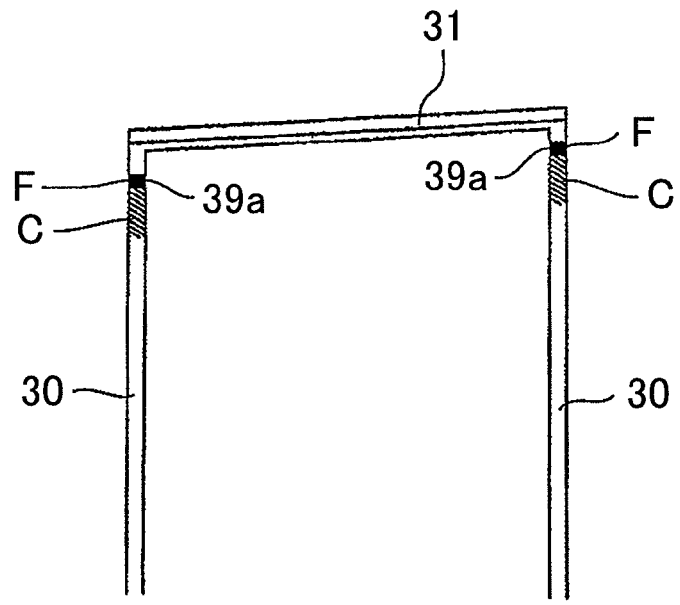
Figure 22B:
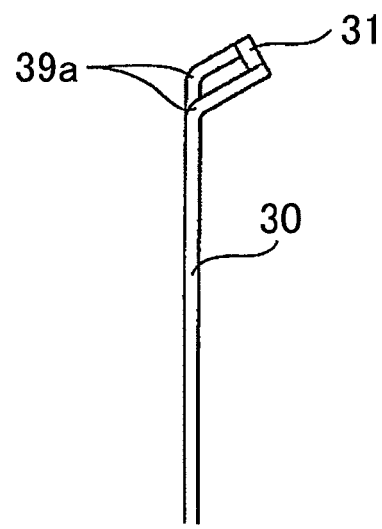
Figure 22C:
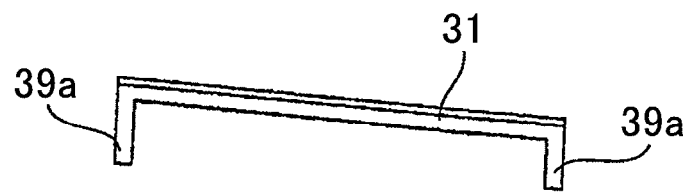

After the material W1 in which the first-end side coupling portions 31 is inclined is obtained as described above, the crank portions 12a, 12b are formed in the material W1 as shown in FIGS. 22 and 23. First, as shown in FIGS. 22A to 22C, with both the straight portions 30, 30 clamped (fixed) at portions at different distances from the first-end side coupling portion 31 (clamp portions C indicated by the shaded areas), portions of both the straight portions 30, 30 on the first-end side coupling portion 31 side are folded to one side at the same time to respectively form the folded portions 39a (shaped portions F indicated by the black areas) on the first-end side in both the straight portions 30, 30. At this time, the clamp portions C are adjacent to the portions at which the folded portions 39a on the first-end side are respectively formed on the side opposite to the first-end side coupling portion 31 (on the second-end side).

Figure 23B:
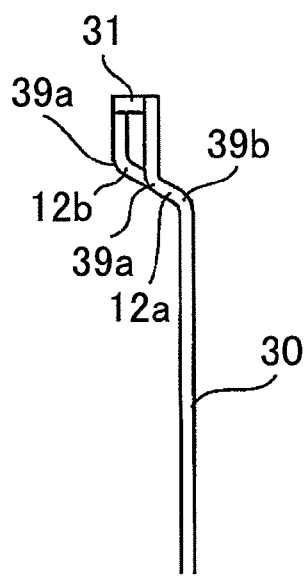
Figure 23C:
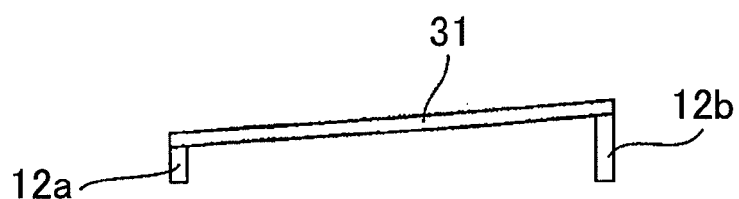

Then, as shown in FIGS. 23A to 23C, with part of both the straight portions 30, 30 clamped (clamp portions C indicated by the shaded areas), portions of both the straight portions 30, 30 on the first-end side coupling portion 31 side are folded to the other side than the case of FIGS. 22A to 22C at the same time to respectively form the folded portions 39b (shaped portions F indicated by the black areas) on the second-end side in both the straight portions 30, 30. At this time, the clamp portions C are adjacent to the portions at which the folded portions 39b on the second-end side are respectively formed on the second-end side. By forming in both the straight portions 30, the folded portions 39a, 39a on the first-end side and the folded portions 39b, 39b on the second-end side which are respectively bent in the same direction and formed at the same time, the crank portions 12a, 12b with different lengths can be obtained with the first-end side coupling portion 31 extending substantially in a direction orthogonal to both the straight portions 30, 30 as shown in FIGS. 23A to 23C.

A processing apparatus that performs the bending process discussed above will be described with reference to FIGS. 24 to 27. A bending apparatus 50 includes a pair of platforms 52, 52 disposed on rails 51a, 51a on a base 51 so as to be movable closer to and away from each other, support plates 53, 53 respectively disposed on platforms 52 so as to be movable in parallel with each other along rails 52a, and bending jigs 54 and fixation jigs 55 respectively provided on support plates 53. The rails 51a, 51a on the base 51 and the rails 52a on the platforms 52 are disposed in directions orthogonal to each other. The support plates 53, 53 are disposed opposite each other, and are movable closer to and away from each other with the respective platforms 52 movable along the rails 51a in the front-back direction of FIGS. 24A, 24C, 25A, 25C, 26A, 26C, 27A, and 27C, and in the left-right direction of FIGS. 24B, 25B, 26B, and 27B. Also, the support plates 53, 53 are movable along the rails 52a on the respective platforms 52, and thus can be shifted with respect to each other in the parallel direction (in the left-right direction of FIGS. 24A, 24C, 25A, 25C, 26A, 26C, 27A, and 27C, and in the front-back direction of FIGS. 24B, 25B, 26B, and 27B).

The bending jig 54 includes a rotary section 54a rotatably supported on the support plate 53, and a generally cylindrical bending section 54b fixed in a projecting manner at a position offset from the rotation center of the rotary section 54a by a predetermined amount. The bending sections 54b provided in the respective support plates 53, 53 are disposed opposite each other. The fixation jig 55 includes a pair of clamp jigs 56, 56 disposed adjacent to the bending section 54b of the support plate 53, and can clamp the straight portion 30 of the material W1 by moving at least one of the clamp jigs 56 in the up-down direction of FIGS. 24 to 27. At this time, the straight portion 30 is placed in a recessed groove 55a provided in a penetrating manner between the pair of clamp jigs 56, 56 in parallel with the rail 52a. Chamfering sections 55d, 55d with a partially cylindrical surface are formed at an opening of the recessed groove 55a on the bending section 54b side at which wall surfaces 55b, 55b of the recessed groove 55a and an end surface 55c of the fixation jig 55 are connected. The curvature of the chamfering sections 55d, 55d corresponds to the curvature of the folded portions 39a, 39b to be formed in the straight portion 30. The relationship between the center of curvature of the chamfering sections 55d, 55d and the turning center of the bending section 54b is the same as the relationship between the bending center P of the offset bending section 22 and the turning center O of the turning shaft 23 shown in FIGS. 9A and 9B discussed earlier.

Figure 25A:
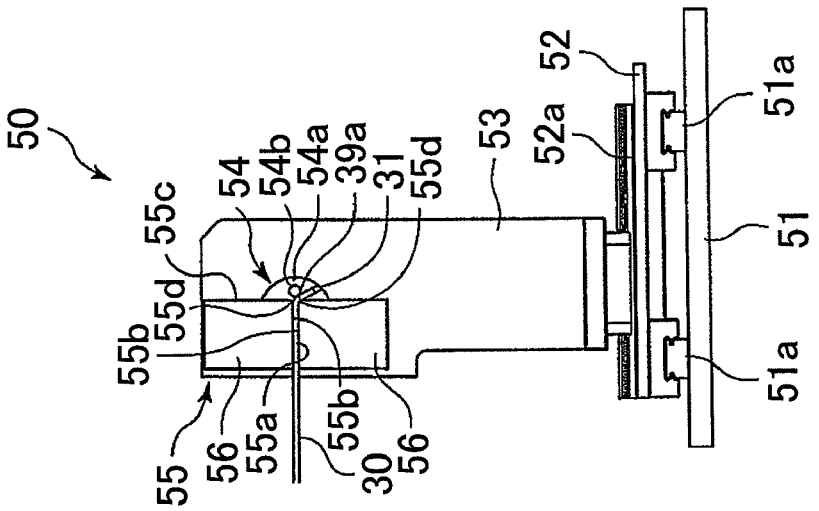
Figure 25B:
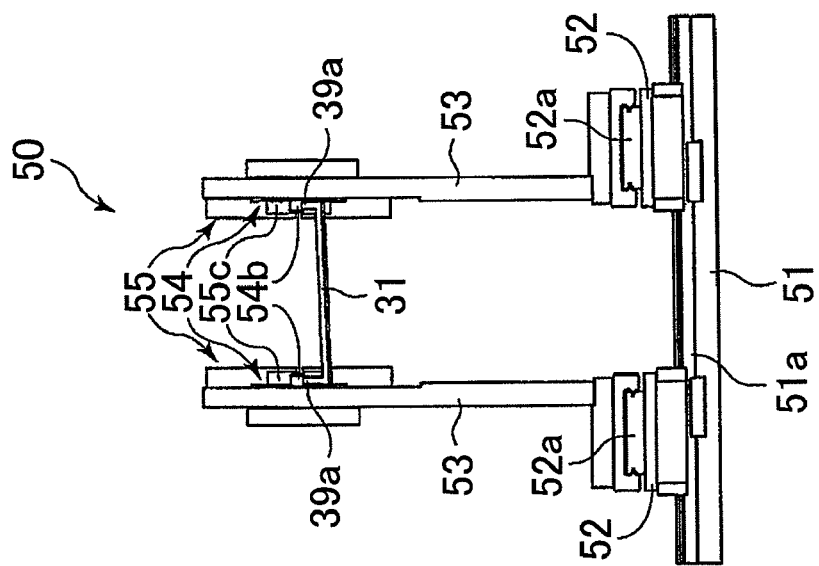
Figure 25C:
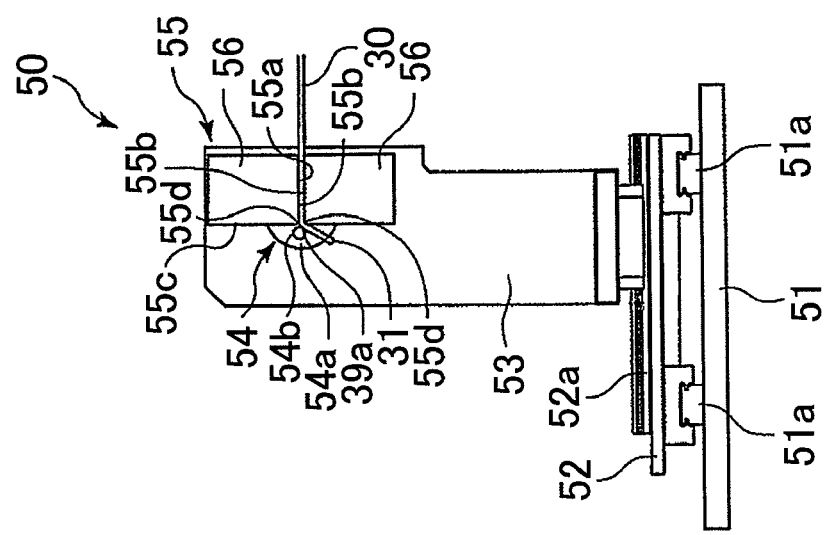

The bending apparatus 50 discussed above performs a bending process as follows. First, the material W1 shown in FIGS. 21A to 21C discussed earlier is placed as shown in FIGS. 24A to 24C. At this time, the pair of straight portions 30, 30 are respectively inserted into the recessed grooves 55a of the fixation jigs 55, 55 disposed opposite each other, and both the straight portions 30, 30 are clamped at predetermined positions. At this time, the platforms 52 supporting the support plates 53, 53 are moved along the rails 51a on the base 51 so as to match the interval between the pair of straight portions 30, 30. Also, the support plates 53, 53 are moved along the rails 52a on the platforms 52 such that the chamfering sections 55d of the recessed grooves 55a are positioned to match portions of the respective straight portions 30, 30 at which the folded portions 39a, 39a are to be formed. In this state, the clamp portions C of FIG. 22A are clamped by the fixation jigs 55, and the shaped portions F are disposed at the chamfering sections 55d. Then, as shown in FIGS. 25A to 25C, the rotary sections 54a, 54a of the bending jigs 54, 54 disposed opposite each other are rotated at the same time so that the bending sections 54b, 54b fold the straight portions 30, 30 at the same time. This results in a shape shown in FIGS. 22A to 22C. The platforms 52 and the support plates 53 are moved and the rotary sections 54a are rotated manually or automatically using an actuator (not shown) or the like.

Figure 27A:
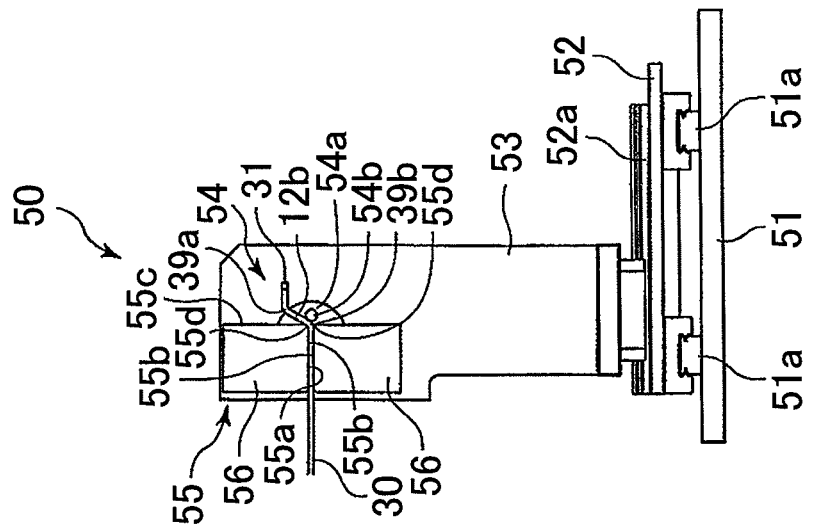
Figure 27B:
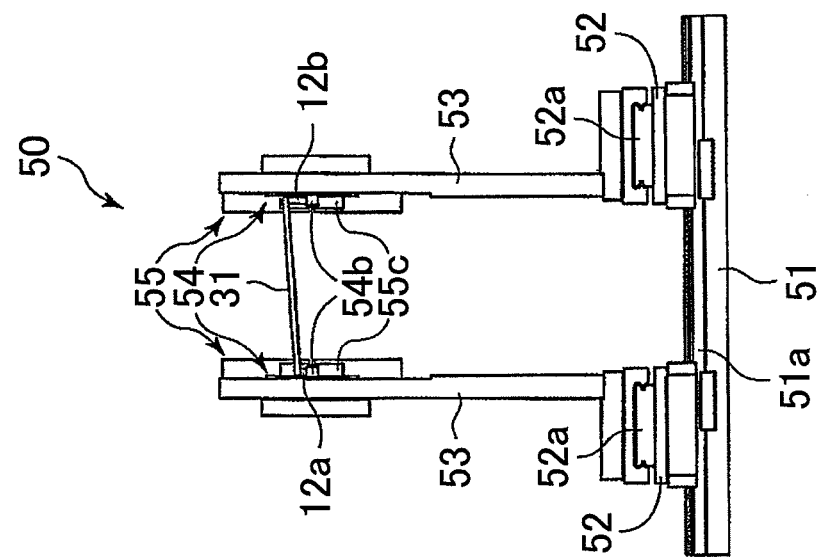
Figure 27C:
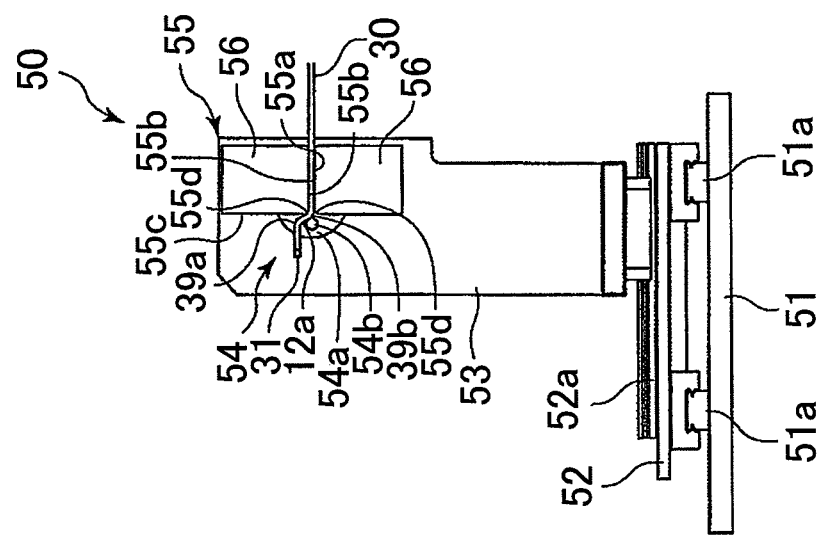

Then, the straight portions 30, 30 are unclamped, and the platforms 52, 52 are moved along the rails 51a to move the support plates 53, 53 away from each other and disengage the straight portions 30, 30 from the recessed grooves 55a, 55a. Then, the bending jigs 54 are further rotated to move the bending sections 54b to the opposite side across the straight portions 30, 30 compared to the state shown in FIGS. 24A to 24C. Then, the support plates 53, 53 are respectively moved along the rails 52a such that the chamfering sections 55d of the recessed grooves 55a are positioned to match portions of the respective straight portions 30, 30 at which the folded portions 39b, 39b are to be formed. Further, the platforms 52, 52 are moved along the rails 51a again such that the interval between the support plates 53, 53 matches the interval between the straight portions 30, 30. The straight portions 30, 30 are respectively placed in the recessed grooves 55a, 55a, and clamped again as shown in FIGS. 26A to 26C. In this state, the clamp portions C of FIG. 23A are clamped by the fixation jigs 55, and the shaped portions F are placed at the chamfering sections 55d. Then, as shown in FIGS. 27A to 27C, the rotary sections 54a, 54a of the bending jigs 54, 54 are rotated at the same time in the direction opposite to the case of FIGS. 25A to 25C so that the bending sections 54b fold the straight portions 30, 30 at the same time. This results in a shape shown in FIGS. 23A to 23C.

According to the first embodiment discussed above, first, as described in relation to FIGS. 4 to 20, the jig 21a at the upstream end is moved such that the jigs 21a, 21e at both ends of the bending apparatuses 20a, 20b move closer to each other along the feeding direction, and the jigs 21a to 21e are turned with respect to each other while applying to the jig 21c at the center a force for movement in one direction in the direction orthogonal to the feeding direction in order to perform a bending process at four locations on the material W2 which is generally straight. The jig 21a at the upstream end is not turnable in the feeding direction of the material W2 and not movable in the direction orthogonal to the feeding direction. Therefore, a bending process can be performed at four locations on the material W2 without tilting the material W2 with respect to the feeding direction, which improves the processing accuracy without increasing the size of the apparatus.

That is, the material W2 is fed by, for example, rotating a bobbin (not shown) which is disposed upstream of the apparatus and around which the material W2 is wound. Thus, it is not necessary to move the entire feeding mechanism which includes such a bobbin if the jig 21a at the upstream end in the feeding direction moves along the feeding direction without being tilted with respect to the feeding direction. As a result, the size of the apparatus is not increased, or the mechanism is not complicated. Unlike the structure disclosed in Japanese Utility Model Application Publication No. JP-U-Sho 58-176037 discussed earlier, a bending process can be performed at four locations on the material W2 in one step. Therefore, it is possible to reduce the processing time and hence the cost. Unlike the structures disclosed in related arts, the material W2 can be bent accurately to improve the processing accuracy with no errors in engagement between gears or engagement between projections.

With the offset bending section 22 disposed at a position offset with respect to the turning shaft 23, a bending process can be performed without displacing the material W2 with respect to the jigs 21a to 21e. Therefore, it is possible to prevent the material from being damaged during a bending process. That is, the material W2 is not displaced (not pulled in) with respect to the suppression section 24 forming the jigs 21a to 21e during a bending process, and therefore it is possible to prevent rubbing between the material W2 and the suppression section 24 and hence damage to the material W2. Since no tensile force acts on the material W2 during a bending process, a bending process can be performed accurately on the material W2.

Even in the case where the material W2 is a rectangular wire forming the coil 4 as discussed above, the rectangular wire can be processed to be bent at four locations with high accuracy. That is, a rectangular wire is limited in terms of the bending direction unlike a round wire with a circular cross section, and therefore cannot be easily processed to be bent at four locations without contrivances. In the case where the rectangular wire is formed into the shape discussed above, in particular, the rectangular wire is bent in different directions, which makes the bending process further more difficult. In contrast, in the case of the first embodiment, a bending process in which a rectangular wire, which is limited in terms of the bending direction, is bent in different directions can be performed easily and with high accuracy. Since the wire is not pulled in during a bending process, an enamel layer for insulation is not damaged during a bending process so that a high-quality coil 4 for rotary electric machines can be obtained.

By using the bending apparatus 20b shown in FIGS. 16 to 20, the material W2 can be processed to be formed with a stepped portion 35 while preventing the material W2 from being pulled in from the downstream side in the feeding direction. Therefore, it is not necessary to provide a structure for displacing the jig 21e at the downstream end, which simplifies the apparatus. That is, in the case where a part of the material W2 is simply pushed by a pressing member during formation of a stepped portion 35, both ends of the material W2 are pulled in toward the stepped portion 35. In contrast, in the first embodiment, the stepped portion 35 is formed by the first pressing member 37 and the second pressing member 38 with the pressing directions of the pressing members appropriately restricted. Therefore, the stepped portion 35 can be formed while preventing the material W2 from being pulled in from the downstream side in the feeding direction. In order to form the stepped portion 35, the first pressing member 37 is disposed at the jig 21c at the center, and the second pressing member 38 is disposed at the jig 21b which is adjacent to the jig 21c at the center on the upstream side. That is, the structure for forming the stepped portion 35 is incorporated in the bending apparatus 20b, and not provided separately. Therefore, it is not necessary to form the stepped portion 35 and perform a bending process using separate processing apparatuses, which shortens the processing time.

By manufacturing the coil 4 for rotary electric machines shown in FIGS. 1 and 2 discussed earlier using the bending apparatuses 20a, 20b according to the first embodiment, the number of joints of the coil 4 can be reduced. Therefore, the manufacturing cost can be reduced, and the size of the coil 4 can be reduced. That is, a large number of folded portions can be formed in one process by performing a bending process on the material W2 as discussed above. Therefore, in the case where the materials after a bending process are joined by welding or the like to obtain the coil 4 shown in FIGS. 2A and 2B discussed earlier, it is possible to reduce the number of joints and hence the manufacturing cost. By reducing the number of joints, the gaps between the coils 4 can be narrowed to reduce the size of the entire coil 4.

Next, in the case of the first embodiment, as described in relation to FIGS. 21 to 27, the first-end side coupling portion 31 is inclined with respect to the direction orthogonal to a pair of the straight portions 30, 30 on both sides of the first-end side coupling portion 31 in accordance with the difference between the lengths of a pair of folded portions 39a, 39b (crank portions 12a, 12b) to be respectively formed in both the straight portions 30, 30 before the folded portions 39a, 39b are formed in the straight portions 30, 30 at the same time. Therefore, the first-end side coupling portion 31 is prevented from being inclined from a desired state with respect to both the straight portions 30, 30 after the folded portions 39a, 39b are formed. That is, the first-end side coupling portion 31 can be made substantially orthogonal to both the straight portions 30, in the case where the crank portions 12a, 12b with different lengths are formed at the same time. In contrast, in the case where crank portions with different lengths are formed at the same time with the first-end side coupling portion 31 not inclined but arranged, for example, in the direction orthogonal to both the straight portions 30, 30, the first-end side coupling portion 31 is inclined with respect to the direction orthogonal to both the straight portions 30, 30 after the crank portions are formed. Therefore, a further step of arranging the inclined first-end side coupling portion 31 in the direction orthogonal to both the straight portions is required, which increases the processing time. Thus, in the case of the first embodiment, the need for such a step is eliminated, thereby reducing the processing time. Moreover, in the first embodiment, portions of the straight portions 30, 30 on the side opposite to the first-end side coupling portion 31 (on the second-end side) with respect to portions at which folded portions 39a (39b) are to be formed are fixed (clamped) during processing. Therefore, the straight portions 30, 30 are not tilted during processing to improve the processing accuracy.

Even in the case where the shape or the number of folded portions to be respectively formed in the pair of straight portions 30, 30 is different from that in the case discussed above, the first-end side coupling portion is prevented from being inclined from a desired state (which is not limited to the orthogonal direction) with respect to both the straight portions after the folded portions are formed by inclining the first-end side coupling portion in accordance with the difference between the lengths of the folded portions. Therefore, the processing time can be reduced.

Second Embodiment

A second embodiment of the present invention will be described with reference to FIGS. 28 to 32. The second embodiment relates to a bending machine 61 that automatically drives a bending apparatus 20c that performs a bending process on a material W2. The bending machine 61 is basically the same as the bending machine according to the first embodiment discussed above except that the former operates automatically. Therefore, the same portions are not described or are described briefly and portions different from the first embodiment are described mainly in the description below.

The bending apparatus 20c includes a bending member 62a coupled to the jig 21a at the upstream end (right side of FIGS. 28 to 32) in the feeding direction of the material W2 (left-right direction of FIGS. 28 to 32) so as to be turnable, bending members 62b, 62c coupled to both sides of the jig 21c at the center so as to be turnable, and a bending member 62d coupled to the jig 21e at the downstream end (right side of FIGS. 28 to 32) so as to be turnable. Of the bending members 62a to 62d, the bending members 62a, 62b provided between the jig 21a and the jig 21c form the jig 21b and the bending members 62c, 62d provided between the jig 21c and the jig 21e form the jig 21d, respectively. In other words, the jig 21b includes the bending members 62a, 62b disposed separately, and the jig 21d includes the bending members 62c, 62d disposed separately.

Each of the bending members 62a to 62d includes a groove 63 in which the material W2 is to be placed. Portions defining the groove 63 on both sides in the turning direction (both sides in the up-down direction in the state of FIG. 28) correspond to a suppression section and a retention section. Each of the jigs 21a, 21c, 21e also includes a suppression section 24 and a retention section 25, and the gap between the suppression section 24 and the retention section 25 serves as a groove 63. The grooves 63 are used to form portions of the material W1 shown in FIG. 3 discussed earlier at which the bent portions 33c with a non-stepped shape are provided. The bending members 62b, 62c disposed on both sides of the jig 21c include, in addition to the groove 63, a separate groove 64 provided at a position shifted in the turning direction with respect to the groove 63. The separate grooves 64 are used to form portions of the material W1 shown in FIG. 3 discussed earlier at which the bent portions 33d in a stepped shape are provided. In this case, portions defining each separate groove 64 on both sides in the turning direction correspond to a suppression section and a retention section.

In the case of the second embodiment, the jig 21c at the center is formed by a pair of jig members 72a, 72b disposed so as to be movable closer to and away from each other. The length of a portion to be bent by the jig 21c and the bending members 62b, 62c can be varied by varying the interval between both the jig members 72a, 72b. Therefore, processing can be performed in accordance with the lengths of the second-end side coupling portions 32a, 32b of the material W1 shown in FIG. 3 discussed earlier by just varying the interval between both the jig members 72a, 72b. In other words, it is not necessary to change the jigs in order to vary the length of the second-end side coupling portions 32a, 32b which is the length between the bent portions. Therefore, it is possible to shorten the processing time, and to reduce the cost with no need to prepare a plurality of jigs. In the second embodiment, the jig member 72a on one side is displaceable together with the bending member 62b. The sliding amount of slide mechanisms 65a, 65c to be discussed next is adjusted in accordance with the interval between the bending members 72a, 72b. By additionally adjusting the sliding amount of a slide mechanism 65b, the length of the straight portions 30, 30 of the material W1 can also be adjusted without changing the jigs.

The bending apparatus 20c configured as discussed above is driven by the bending machine 61. The bending machine 61 includes a plurality of slide mechanisms 65a, 65b, 65c, a plurality of motors 66a, 66b, 66c, 66d, 67a, 67b, 67c, 67d, 67e, 73, and so forth. Each of the slide mechanisms 65a to 65c includes a screw 68 rotatable by the motors 66a to 66d, and a movable table 69, 70 movable along the screw 68 by rotating the screw 68. That is, a nut member (not shown) fixed to the movable table 69, 70 is screwed onto the screw 68 so that the movable table 69, 70 is slidable together with the nut member by rotation of the screw 68. If the slide mechanism is implemented by a ball screw mechanism, smooth sliding is enabled. The motors 67a to 67d are respectively disposed on the movable table 69, 70 or a fixed table 71, and turn the bending members 62a to 62d and the jig 21e at the downstream end by a predetermined angle respectively via a speed reduction mechanism such as a gear mechanism.

The arrangement of the members discussed above will be described. First, in the slide mechanism 65a disposed in the lower right of FIG. 28, the screw 68 is disposed in parallel with the feeding direction of the material W2 so that the movable table 69 is slidable in parallel with the feeding direction by rotating the motor 66a. The motor 66a and the slide mechanism 65a form a first drive unit. While the movable table 69 is also movable in the direction orthogonal to the feeding direction by the motor 66d, such sliding movement is not used in the current bending process. The jig 21a at the upstream end and the bending member 62a are installed on the movable table 69. The motor 67a and a speed reduction mechanism that transmits rotation of the motor 67a are also installed on the movable table 69. Thus, the jig 21a, the bending member 62a, the motor 67a, and the speed reduction mechanism for the motor 67a are also slidable together with the movable table 69 in the feeding direction. The motor 67a and the speed reduction mechanism that turn the bending member 62a of the jig 21b and the motors 67b to 67d and the respective speed reduction mechanisms that turn the jigs 21b to 21d form a second drive unit. While the second drive unit includes respective motors for the jigs, the second drive unit may be structured such that a plurality of the turning portions of the jigs 21b to 21d are driven by a single motor. For example, in a structure in which the pair of jig members 72a, 72b forming the jig 21c at the center do not move closer to and away from each other, the turning portions of the bending members 62b, 62c may be turned by a single motor via respective speed reduction mechanisms.

Figure 28:
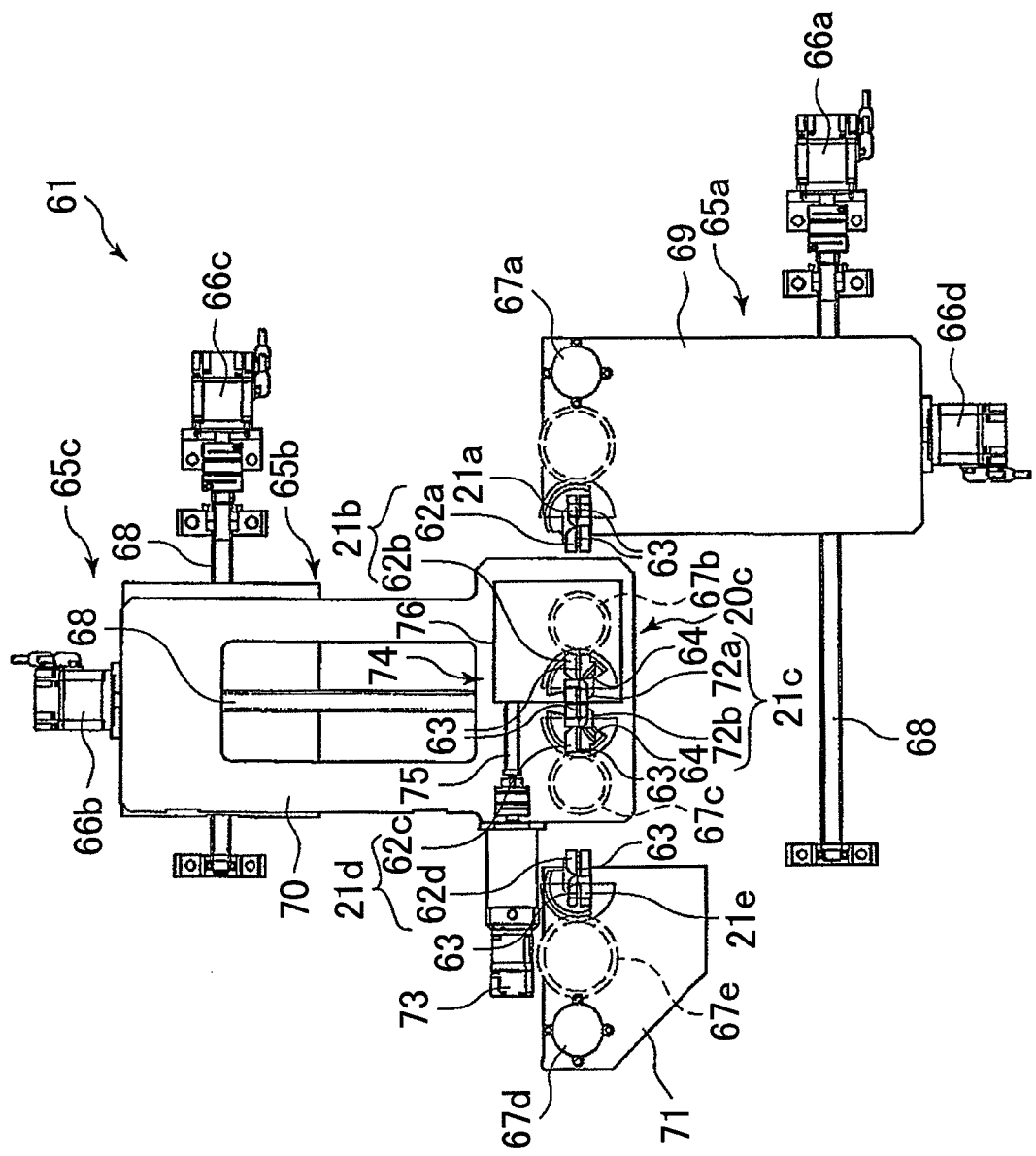
FIG. 28 is a plan view of a bending machine incorporating a bending apparatus according to a second embodiment of the present invention.

In the slide mechanism 65b disposed in the center of FIG. 28, the screw 68 is disposed in the direction orthogonal to the feeding direction of the material W2 so that the movable table 70 is slidable in the orthogonal direction by the rotation of the motor 66b. In the slide mechanism 65c disposed in the top of FIG. 28, the screw 68 is disposed in parallel with the feeding direction of the material W2 so that the movable table 70 is slidable in the feeding direction by the rotation of the motor 66c. The motors 66b, 67c and the slide mechanisms 65b, 65c form a third drive unit. The jig 21c at the center and the bending members 62b, 62c are installed on the movable table 70. The motors 67b, 67c and speed reduction mechanisms that respectively transmit rotation of the motors 67b, 67c are also installed on the movable table 70. Thus, the jig 21c, the bending members 62b, 62c, the motors 67b, 67c, and the respective speed reduction mechanisms for the motors 67b, 67c are also slidable together with the movable table 70 in the direction orthogonal to the feeding direction by the slide mechanism 65b and in the feeding direction by the slide mechanism 65c.

The jig member 72a forming the jig 21c at the center and a motor 73 and a slide mechanism 74 that move the bending member 62a are installed on the movable table 70 as discussed above. The slide mechanism 74 includes a screw 75 disposed in parallel with the feeding direction and a movable table 76 movable along the screw 75. The jig member 72a, the bending member 62a, and the motor 67b and a speed reduction mechanism that drive the bending member 62a are installed on the movable table 76. The motor 73 drives the movable table 76 to move along the feeding direction together with the respective members so that the jig members 72a, 72b are movable closer to and away from each other.

The fixed table 71 disposed in the left of FIG. 28 is fixed to a fixed portion such as a platform (not shown) so as not to be movable. The jig 21e at the downstream end and the bending member 62d are installed on the fixed table 71. The motors 67d, 67e and speed reduction mechanisms that respectively transmit rotation of the motors 67d, 67e are also installed on the fixed table 71. The motor 67d and the speed reduction mechanism for the motor 67d form a sixth drive unit. The motor 67e, which is used to turn the jig 21e, is not used in a normal bending process. For example, the motor 67e is used in the case where the distal end of the material W2 is not bent so that the straight portion 30 is extended as it is in the state of the material W1. In this case, the jig 21e is rotated together with the bending member 62d in the same direction such that the groove 63 of the jig 21e and the groove 63 of the bending member 62d become straight. A terminal for connection with another coil is formed by extracting the straight portion 30 of the material W2 as it is as described above.

Figure 29:
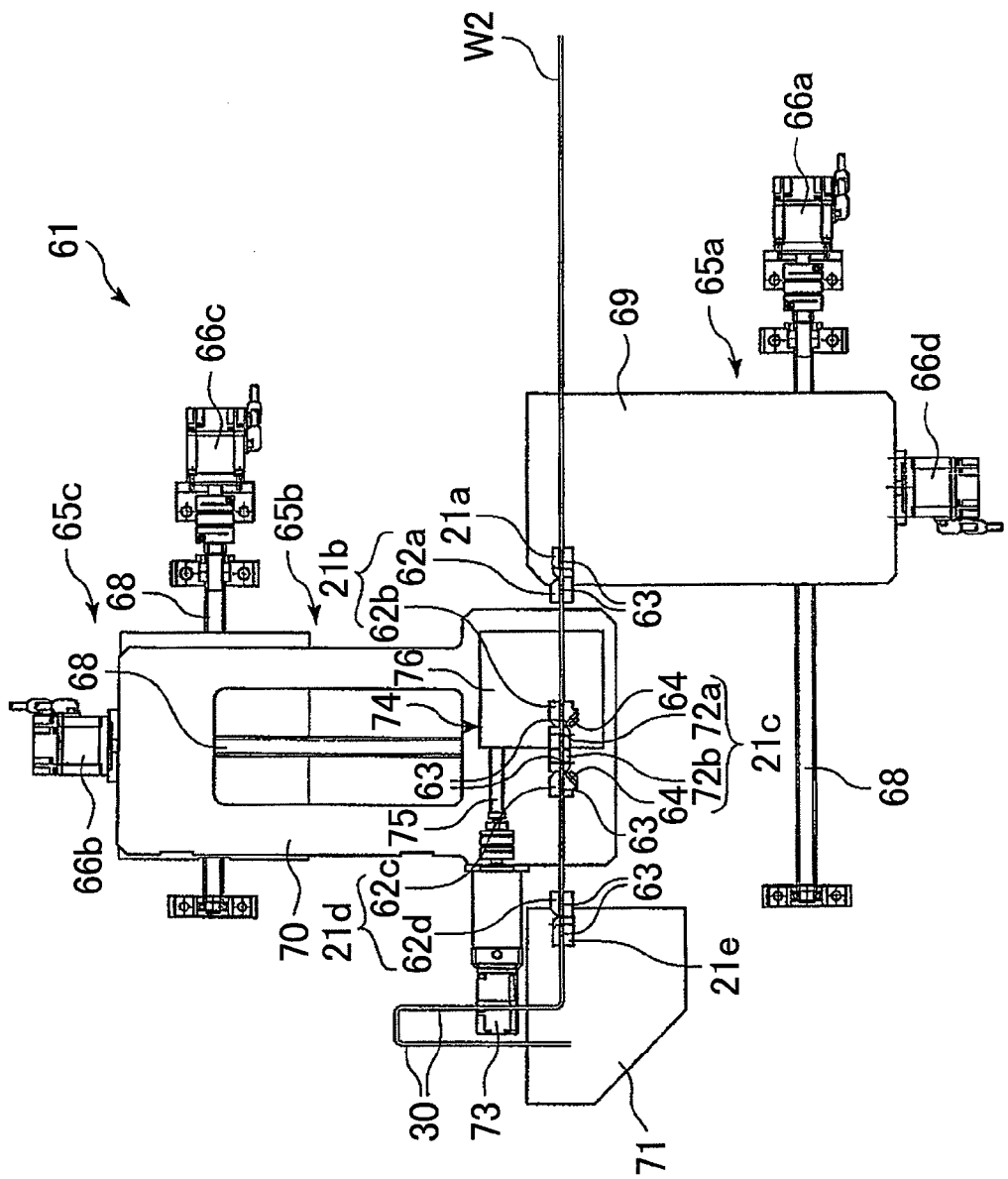
FIG. 29 is a plan view of the bending machine showing a state in which the material is placed on a bending apparatus as partially omitted.

The bending apparatus 20c and the bending machine 61 configured as discussed above perform a bending process on the material W2 as follows. First, as shown in FIG. 29, the positions of the movable tables 69, 70 are adjusted such that the grooves 63 of the jigs 21a, 21c, 21e and the bending members 62a to 62d are on a straight line along the feeding direction. Then, in this state, the material W2 is placed in the grooves 63. As shown in FIG. 29, a process in which the jig 21e is turned as discussed above has been performed in advance to form the distal end of the material W2 into a rectangular wave shape with a portion of the straight portion 30 at the downstream end extended.

Figure 30:
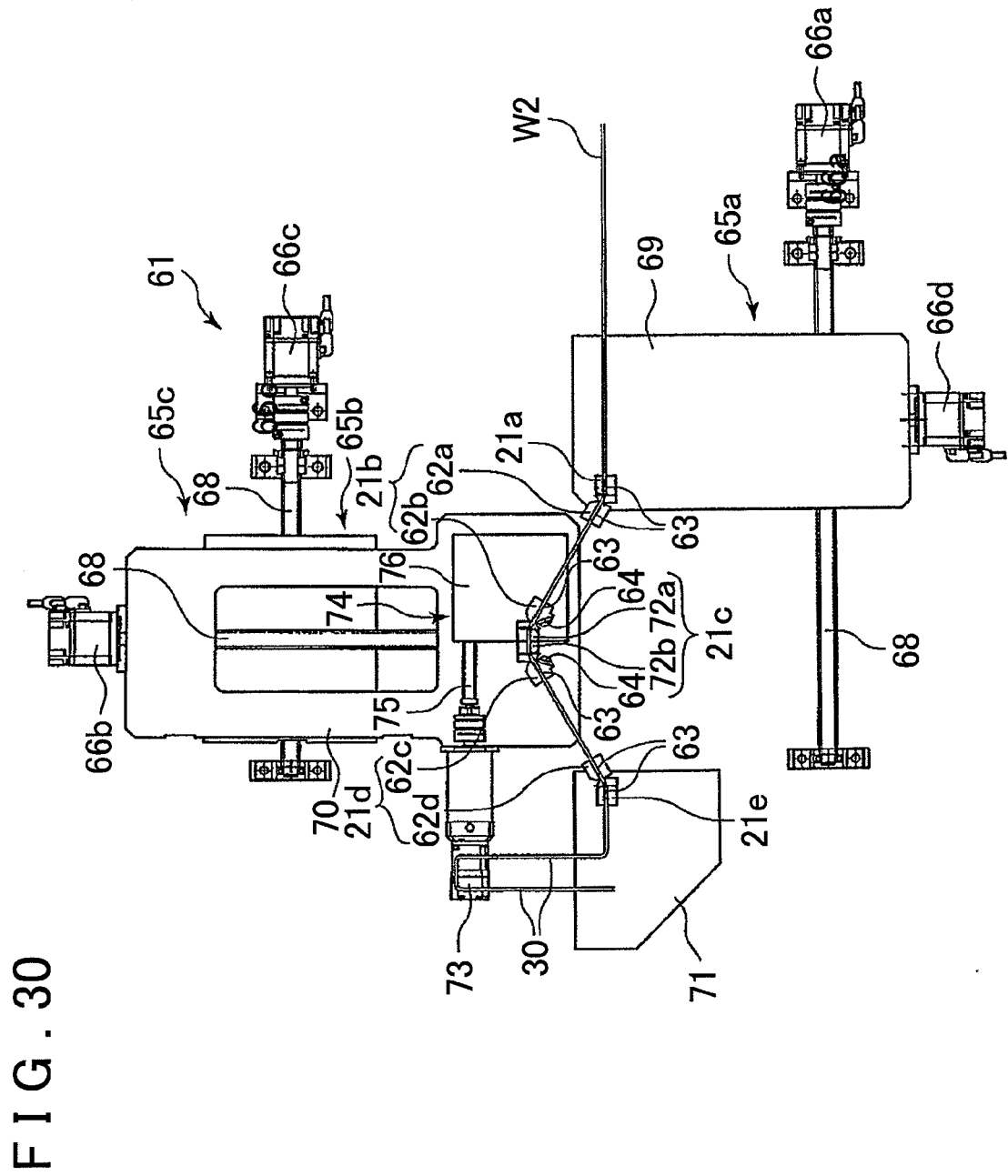
FIG. 30 shows a first step of a bending process, which is similar to FIG. 29.
Figure 31:
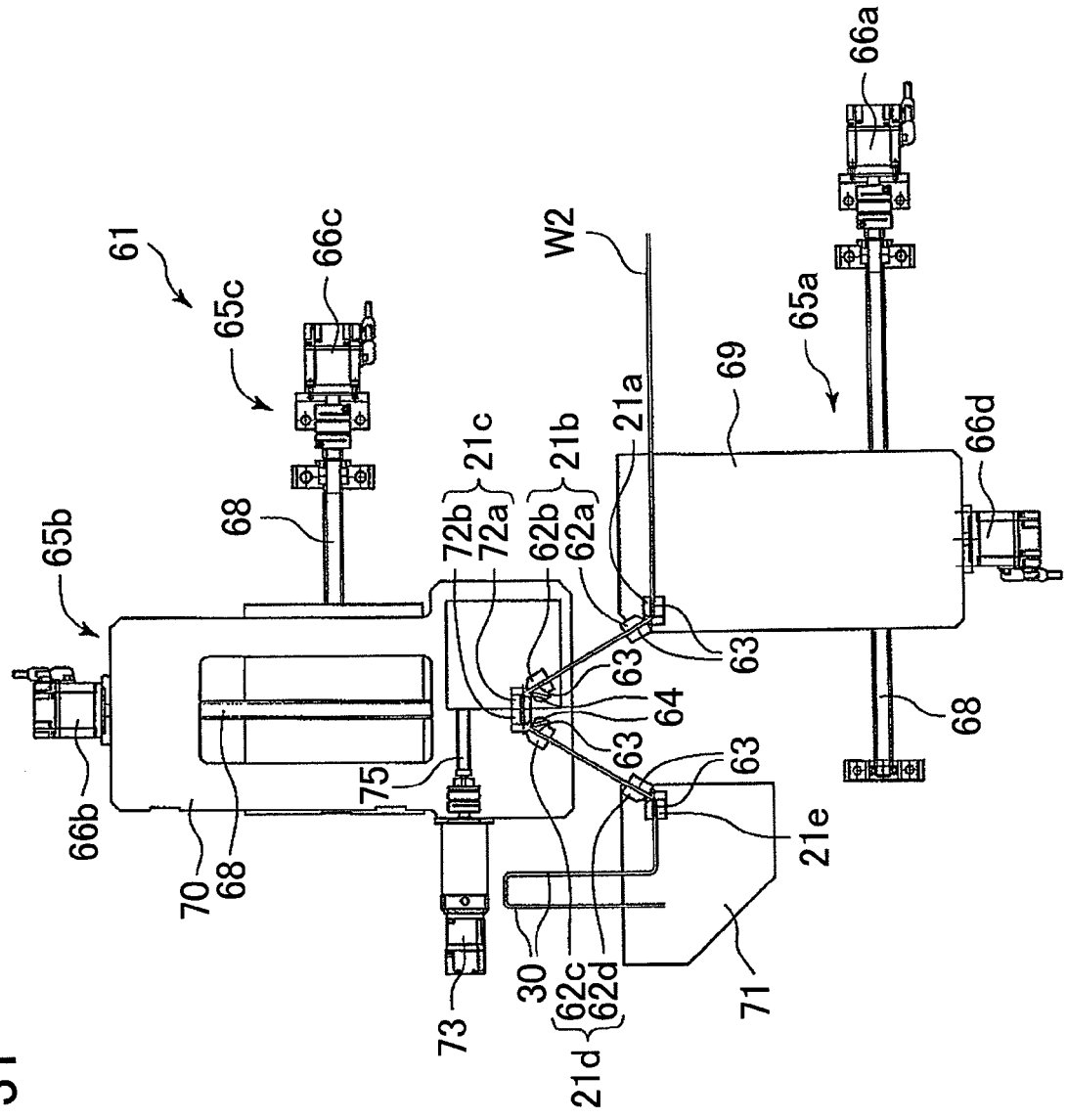
FIG. 31 shows a second step of the same bending process, which is similar to FIG. 29.
Figure 32:
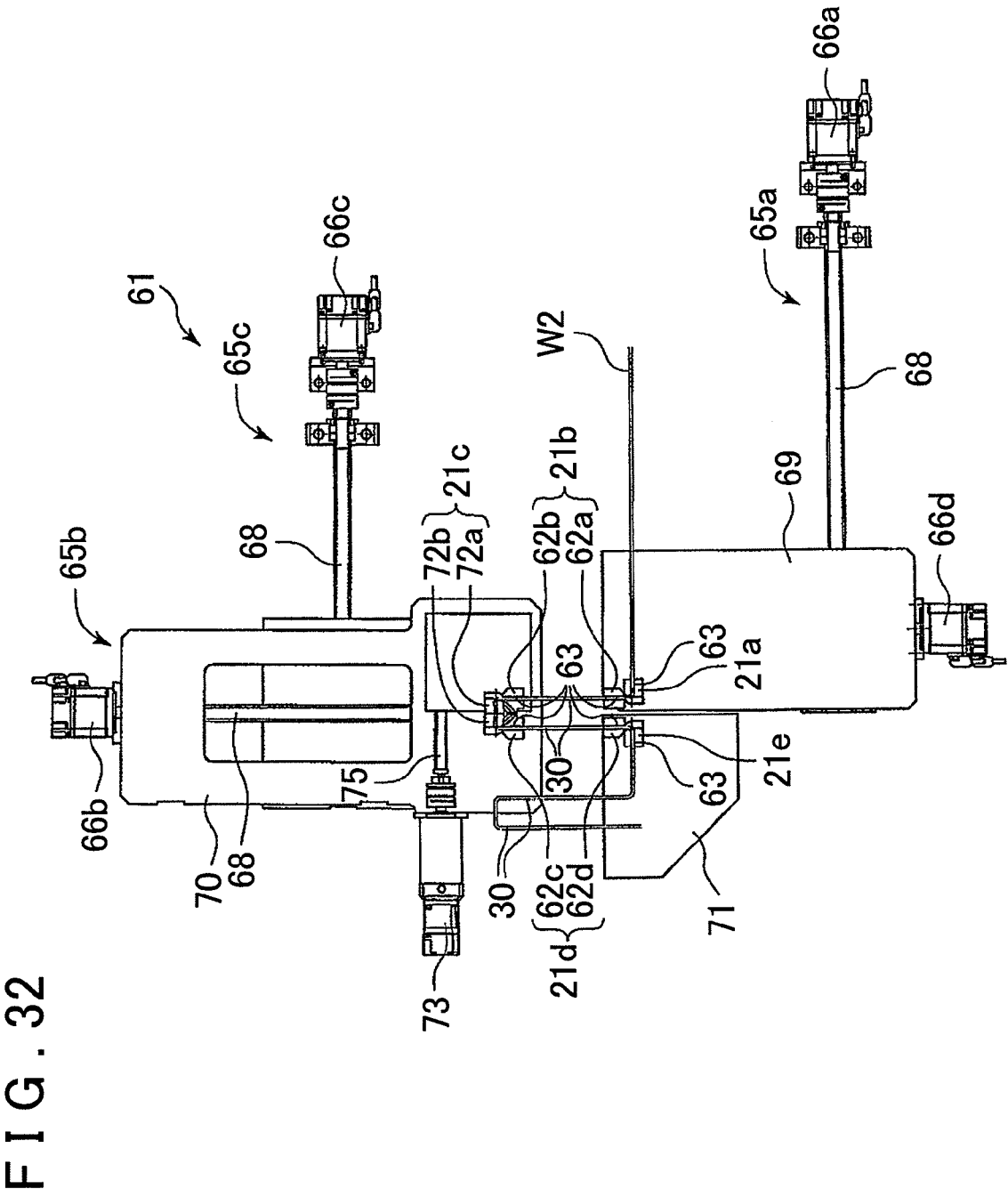
FIG. 32 shows a third step of the same bending process, which is similar to FIG. 29.
Figure 33A:
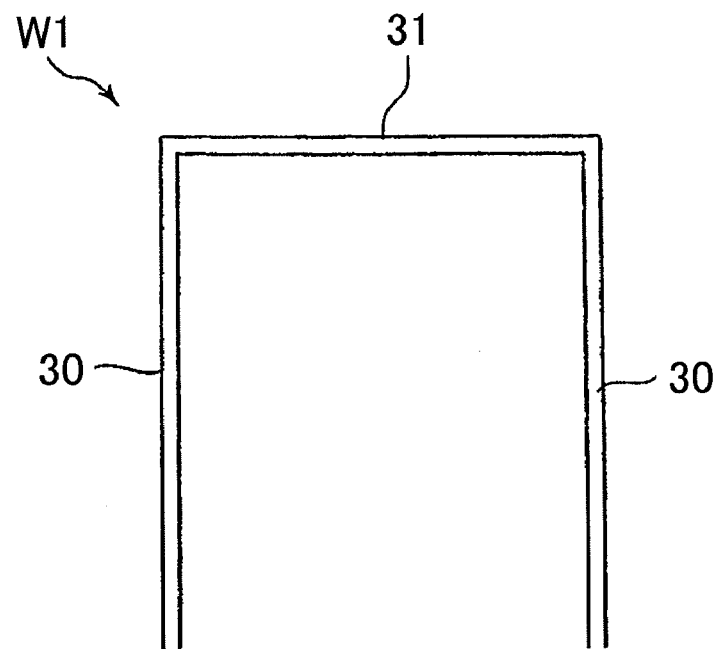
Figure 33B:
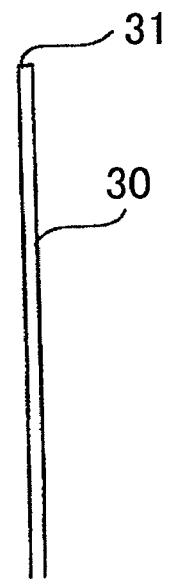
Figure 34A:
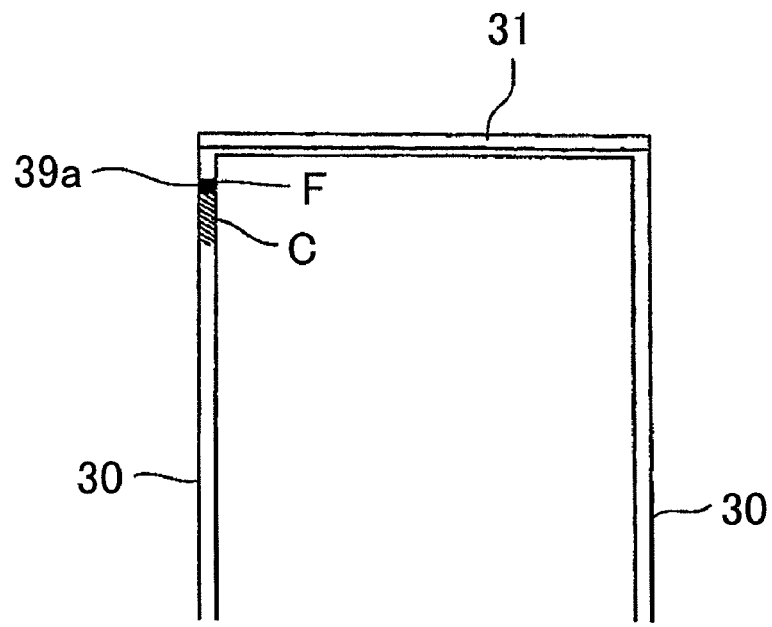
Figure 34B:
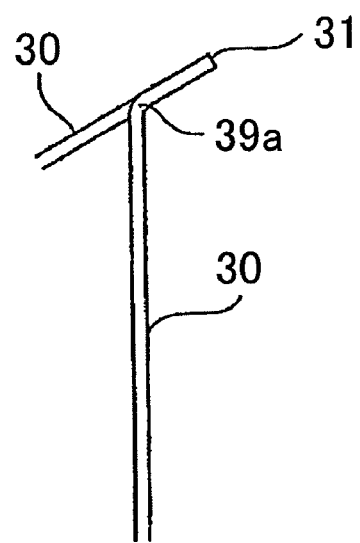
Figure 35A:
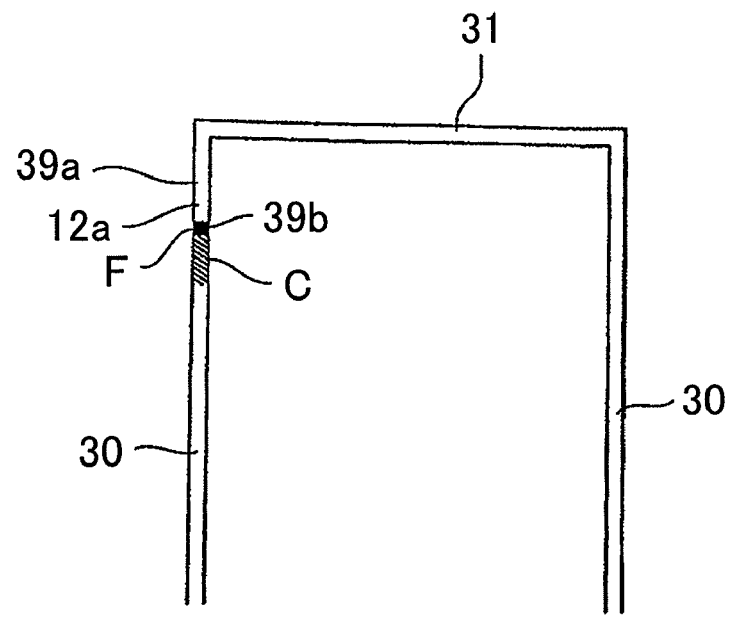
Figure 35B:
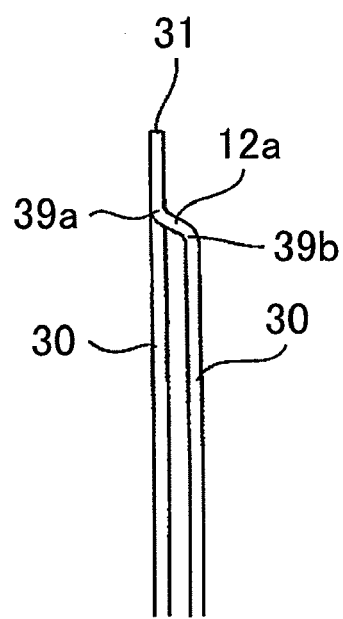
Figure 36A:
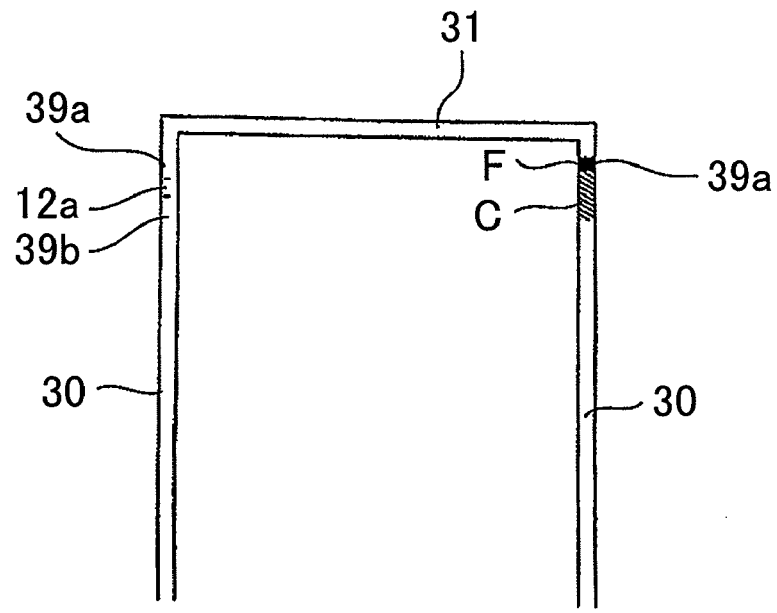
Figure 36B:
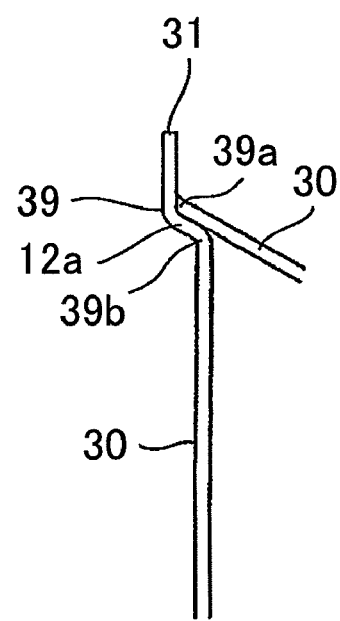
Figure 37A:
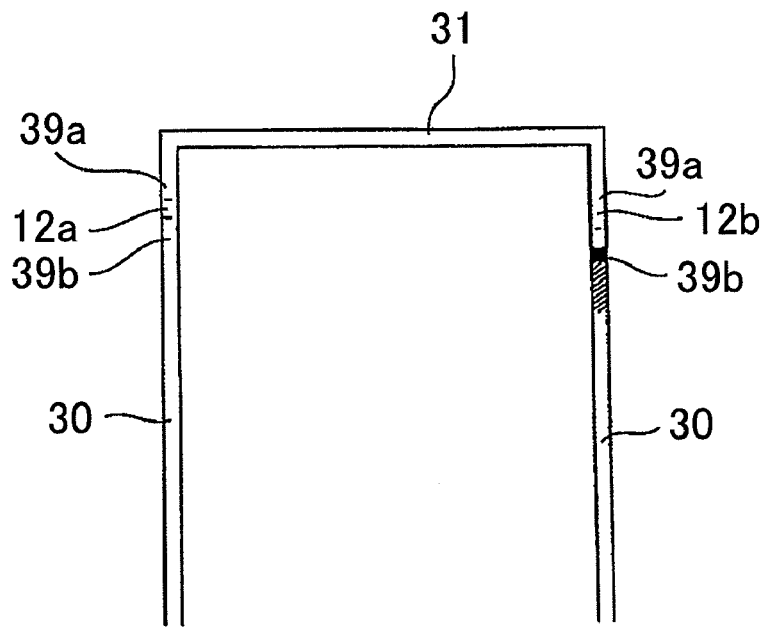
Figure 37B:
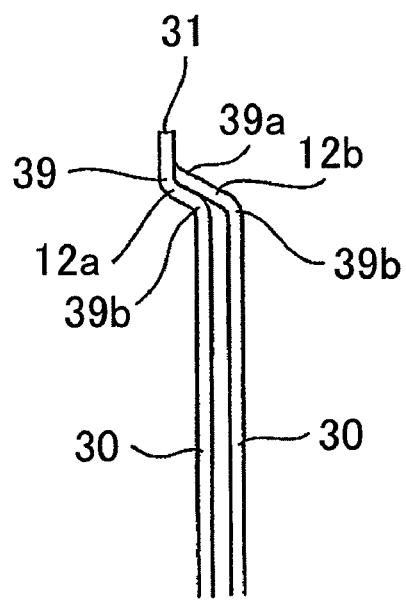
Figure 38A:
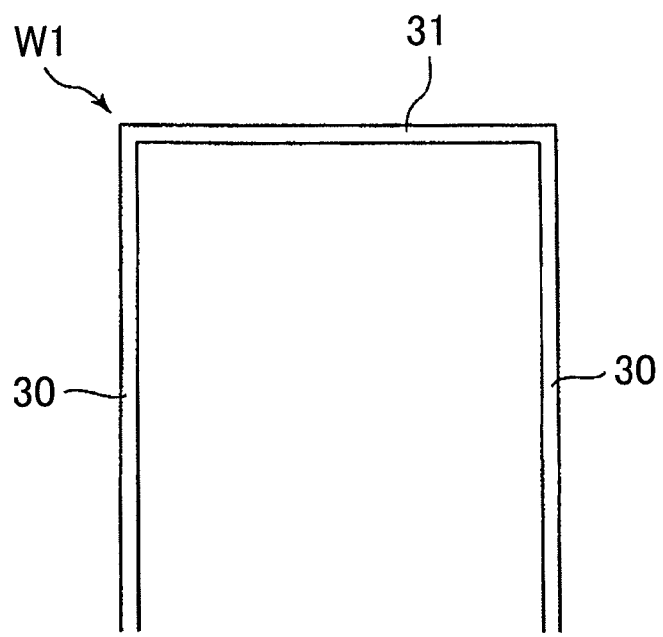
Figure 38B:
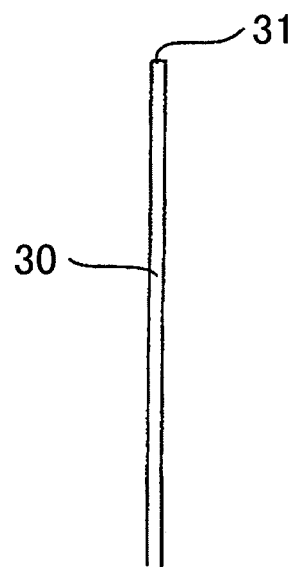
Figure 38C:
Figure 39A:
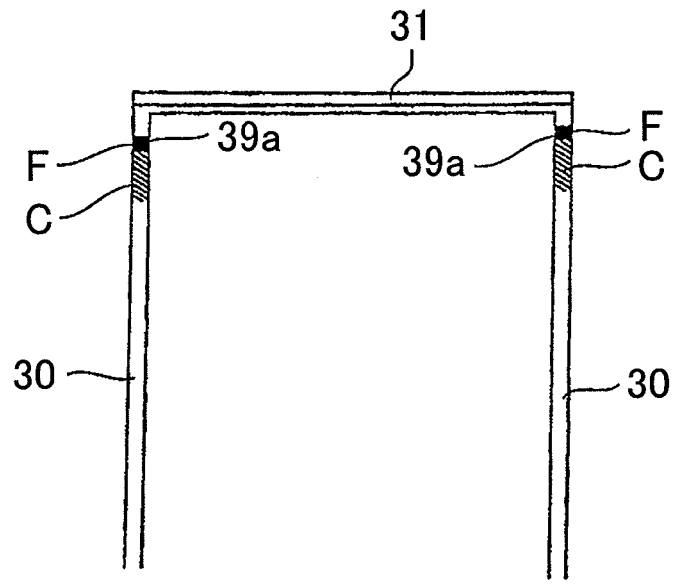
Figure 39B:
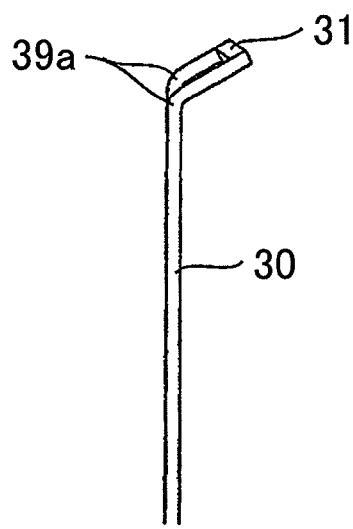
Figure 39C:
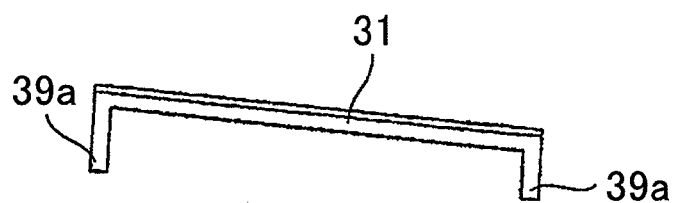
Figure 40A:
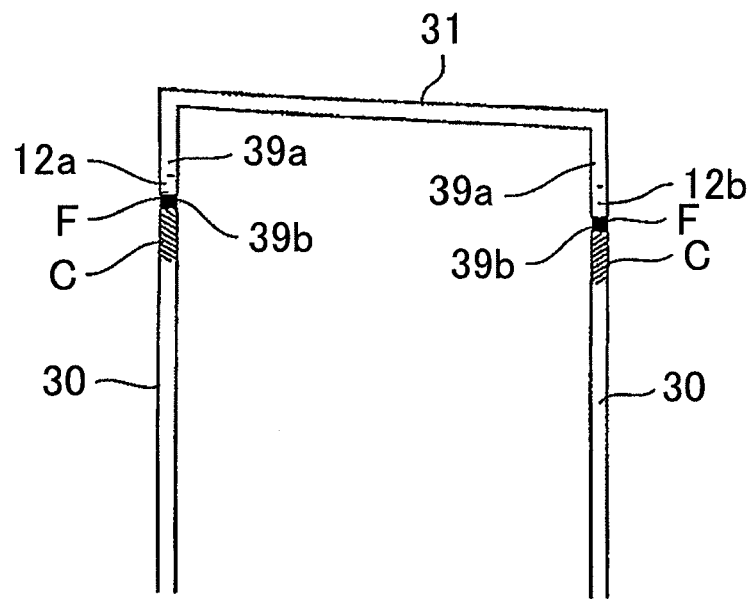
Figure 40B:
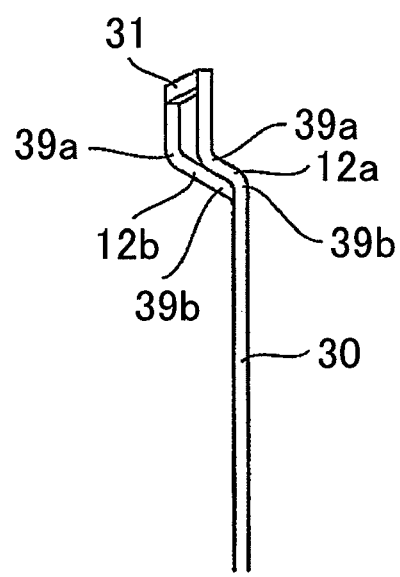
Figure 40C:
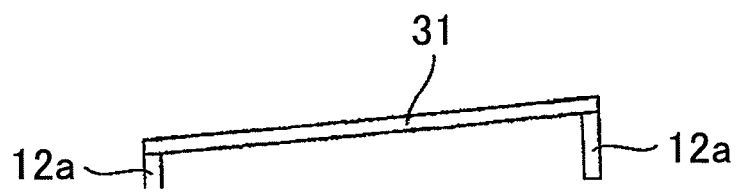

Next, as shown in FIGS. 30 and 31, the movable table 69 is moved downstream in the feeding direction, and the movable table 70 is moved in the direction orthogonal to the feeding direction and downstream in the feeding direction. At this time, the motors 67a to 67d are driven in sync with movement of the movable tables 69, 70 to turn the bending members 62a to 62d with respect to the jigs 21a, 21c, 21e respectively in predetermined directions by predetermined amounts. Consequently, the jig 21a at the upstream end is moved such that the jigs 21a, 21e at both ends move closer to each other along the feeding direction, and the jigs 21a to 21e are turned with respect to each other such that the respective bending angles of the jigs 21a to 21e become predetermined angles while applying to the jig 21c at the center a force for movement in one direction (toward the top of FIGS. 28 to 32) in the direction orthogonal to the feeding direction. When the movable tables 69, 70 are moved and the bending members 62a to 62d are turned until the state shown in FIG. 32 is reached, the bending process is terminated. In order to perform a bending process on the next portion of the material W2, the jigs 21a, 21c, 21e and the bending members 62a to 62d are descended, or the material W2 is ascended, with a chuck (not shown) grasping the material W2 to disengage the material W2 from the grooves 63, and after the material W2 is fed by a predetermined amount, a reverse operation is performed to place the material W2 in the grooves 63. Then, the steps shown in FIGS. 29 to 32 are repeatedly performed.

In order to form a portion of the material W1 shown in FIG. 3 discussed earlier at which the bent portion 33d in a stepped shape is provided, the bending members 62b, 62c are turned from the state of FIG. 28 to the upper side of FIG. 28 so as to be inclined with respect to the groove 63 of the jig 21c. In this state, the groove 63 and the separate grooves 64 of the bending members 62b, 62c are connected. At this time, the shape formed by the grooves 64 and the groove 63 is the same as the shape of the stepped portion 35 of the material W2 shown in FIG. 19 discussed earlier. In the second embodiment described above, the material W2 with the stepped portion 35 formed in advance is placed on the bending apparatus 20c. Then, the bent portion 33d in a stepped shape can be formed by performing the steps of FIGS. 29 to 32 discussed above.

According to the second embodiment discussed above, a bending process can be automatically performed at four locations on a material. Moreover, processing can be performed in accordance with the lengths of the second-end side coupling portions 32a, 32b of the material W1 or the lengths of the straight portions 30, 30 by varying the interval between the jig members 72a, 72b of the jig 21c at the center without changing the sets of jigs. Other configurations and functions are the same as those of the first embodiment discussed earlier.

In the case of the second embodiment, the bending process discussed above can be enabled by providing at least two of the drive units discussed above, namely the first drive unit (the motor 66a and the slide mechanism 65a) that moves the jig 21a at the upstream end in the feeding direction, the second drive unit (the motors 67a to 67d and the respective speed reduction mechanisms) that turns the jigs 21a to 21e, and the third drive unit (the motors 66b, 66c and the slide mechanisms 65b, 65c) that moves the jig 21c at the center in the direction parallel with the feeding direction and in the direction orthogonal to the feeding direction. It is possible to appropriately incorporate the configuration of the first embodiment into the second embodiment. For example, it is possible to incorporate the structure in which the stepped portion 35 is formed by the first pressing member 37 and the second pressing member 38 of the bending apparatus 20b. In this case, motors that drive both the pressing members 37, 38 are provided.

The bending method according to the present invention can be used to form a coil for a motor, and is particularly suitable to perform a complicated bending process for forming a coil for a motor for hybrid vehicles.

What is claimed is:

1. A bending method for forming, in a material in which a plurality of straight portions extending in parallel with each other and a first-end side coupling portion and a second-end side coupling portion provided alternately to couple first-end portions and second-end portions, respectively, of adjacent ones of the straight portions with each other are successively formed, folded portions respectively in a pair of the straight portions provided on both sides of the first-end side coupling portion, a length from one of the folded portions to the first-end side coupling portion being different from a length from the other of the folded portions to the first-end side coupling portion, the bending method comprising the steps of:
shaping the material such that the first-end side coupling portion is inclined with respect to a direction orthogonal to the pair of the straight portions in accordance with a difference between the lengths of the folded portions to be respectively formed in both the straight portions; and
thereafter forming the folded portions in both the straight portions at the same time, the folded portions being bent in the same direction as each other.

2. The bending method according to claim 1, wherein a pair of folded portions bent in directions opposite to each other are formed in each of the pair of the straight portions, a length between the first-end side coupling portion and one of the pair of folded portions on the second-end side in one of the straight portions being different from a length between the first-end side coupling portion and one of the pair of folded portions on the second-end side in the other of the straight portions.

3. The bending method according to claim 1, wherein the folded portions are formed in the state where portions of both the straight portions on a side opposite to the first-end side coupling portion with respect to the folded portions are fixed.

* * * * *